(12) United States Patent
Johnson et al.

(10) Patent No.: US 8,930,308 B1
(45) Date of Patent: Jan. 6, 2015

(54) METHODS AND SYSTEMS OF ASSOCIATING METADATA WITH MEDIA

(75) Inventors: Christopher E. Johnson, Cambridge, MA (US); Harriet Ruth Owers-Bradley, Cambridge, MA (US); Anatole Khesin, Somerville, MA (US); Roger S. Zimmerman, Wellesley, MA (US); Joshua Miller, Charlestown, MA (US); Jeremy E. Barron, Medford, MA (US); Christopher S. Antunes, Arlington, MA (US)

(73) Assignee: 3Play Media, Inc., Cambridge, MA (US)

( * ) Notice: Subject to any disclaimer, the term of this patent is extended or adjusted under 35 U.S.C. 154(b) by 40 days.

(21) Appl. No.: 13/589,801

(22) Filed: Aug. 20, 2012

(51) Int. Cl.
*G06F 17/30* (2006.01)
(52) U.S. Cl.
USPC .......................................... 707/610; 707/793
(58) Field of Classification Search
CPC ................................................ G06F 17/30017
USPC .......................... 707/793, 796, 802, 803, 805
See application file for complete search history.

(56) References Cited

U.S. PATENT DOCUMENTS

| 7,028,252 | B1 | 4/2006 | Baru et al. | |
| 7,272,779 | B2* | 9/2007 | Deshpande | 715/202 |
| 7,996,431 | B2* | 8/2011 | Coffman et al. | 707/796 |
| 8,027,999 | B2* | 9/2011 | Coffman et al. | 707/796 |
| 8,103,646 | B2 | 1/2012 | Brown | |
| 8,161,111 | B2* | 4/2012 | Espelien | 709/205 |
| 8,572,488 | B2* | 10/2013 | Phillips et al. | 715/716 |
| 8,654,951 | B1* | 2/2014 | Olmsted et al. | 379/202.01 |
| 8,688,679 | B2* | 4/2014 | Lalji et al. | 707/707 |
| 2004/0040042 | A1* | 2/2004 | Feinleib | 725/112 |
| 2009/0198719 | A1* | 8/2009 | DeWitt | 707/102 |
| 2009/0306979 | A1 | 12/2009 | Jaiswal et al. | |
| 2011/0069230 | A1 | 3/2011 | Polumbus et al. | |
| 2012/0078899 | A1* | 3/2012 | Fontana et al. | 707/736 |
| 2012/0079380 | A1* | 3/2012 | Tsai et al. | 715/716 |
| 2012/0236201 | A1* | 9/2012 | Larsen et al. | 348/468 |

* cited by examiner

*Primary Examiner* — Cam-Linh Nguyen
(74) *Attorney, Agent, or Firm* — Lando & Anastasi, LLP

(57) ABSTRACT

A system for associating metadata with at least one media file is provided. The system includes a memory storing transcription information associated with the at least one media file, at least one processor coupled to the memory, and a component executed by the at least one processor and configured to associate metadata with the at least one media file by storing an association between the transcription information and the metadata within the memory. In the system, the transcription information may be synchronized with the at least one media file and the association engine may be further configured to associate the metadata with a portion of the at least one media file by storing an association between a portion of the transcription information and the metadata.

20 Claims, 16 Drawing Sheets

PROFESSOR FLITWICK: Now, to solve the equation ax^2 + bx + c + 0, we simply plug the coefficients into the quadratic formula we spoke of earlier. Yes?
STUDENT 1: Why do we need to use the coefficients?
FIG. 12
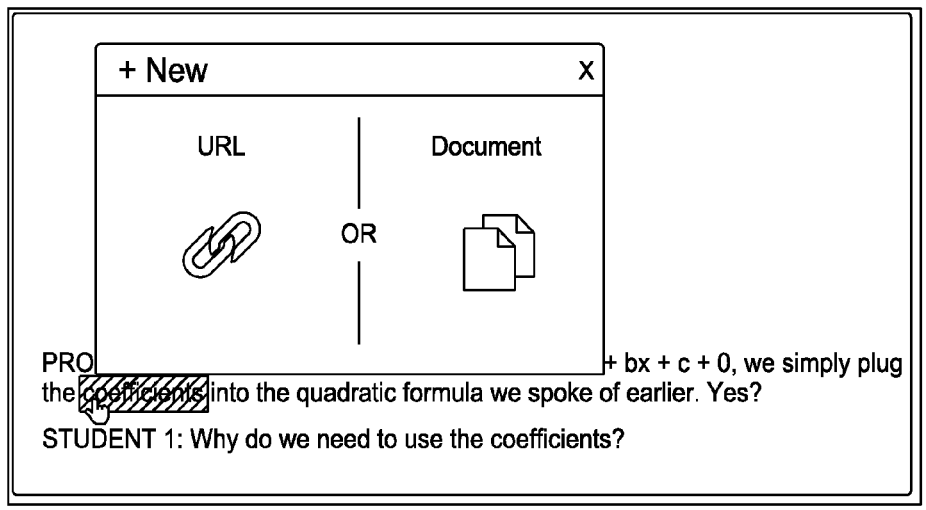
FIG. 13
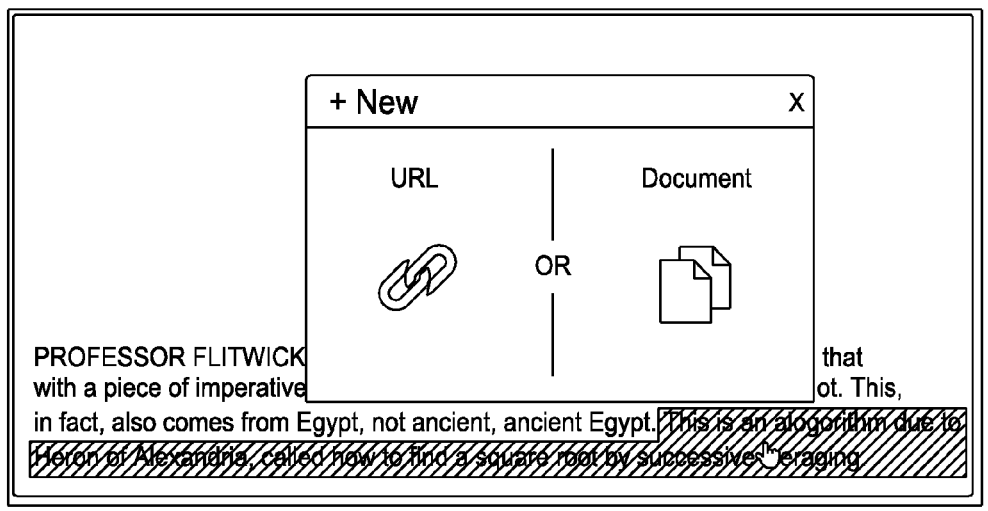
FIG. 14

Select URL:

From library:

http://www.quadraticequations/tutor...

Enter new:

http://

Settings:

Start at: 00:37:21    End at: 00:37:31

☑ "coefficients" appears 4 times. Apply to all

SAVE

PRO+ bx + c + 0, we simply plug the coefficients into the quadratic formula we spoke of earlier. Yes?
STUDENT 1: Why do we need to use the coefficients?

FIG. 15

Select Document:    x

From library:

Coefficients_Explained.pdf

From Computer:

browse files

SAVE    ☑ "coefficients" appears 4 times. Apply to all

PRO+ bx + c + 0, we simply plug the coefficients into the quadratic formula we spoke of earlier. Yes?
STUDENT 1: Why do we need to use the coefficients?

FIG. 16

```xml
<?xml version="1.0" encoding="utf-8"?>
</speaker_sequence>
<token_sequence>
<speaker_tag id="1">
<start_frame>138</start_frame><end_frame>2093</end_frame><string>PROFESSOR FLITWICK:</string>
</speaker_tag>
<token id="1"> <string>Now,</string><start_frame>138</start_frame><end_frame>167</end_frame>
</token>
<token id="2">
<string>to</string><start_frame>167</start_frame><end_frame>200</end_frame>
</token>
<token id="3">
<string>solve</string><start_frame>200</start_frame><end_frame>267</end_frame>
</token>
<token id="4">
<string>the</string><start_frame>267</start_frame><end_frame>284</end_frame>
</token>
<token id="5">
<string>equation</string><start_frame>284</start_frame><end_frame>339</end_frame>
</token>
<token id="6">
<string>ax^2</string><start_frame>369</start_frame><end_frame>401</end_frame>
</token>
<token id="7">
<string>+</string><start_frame>401</start_frame><end_frame>425</end_frame>
</token>
...
<speaker_tag id="2">
<start_frame>2093</start_frame><end_frame>3456</end_frame><string>STUDENT 1:</string>
</speaker_tag>
<token id="27"> <string>Why</string><start_frame>2093</start_frame><end_frame>2108</end_frame>
</token>
...
</token_sequence>
```

FIG. 22

METHODS AND SYSTEMS OF ASSOCIATING METADATA WITH MEDIA

BACKGROUND

1. Technical Field

The technical field relates generally to generation and presentation of online media and, more particularly, to systems and methods that associate metadata with media.

2. Background Discussion

There are a wide variety of conventional approaches to associating metadata with online media. These approaches include file-level association in which metadata is associated with an entire media file and portion-level association in which metadata is associated with identified portions of the media file. Conventional technology allows a user to perform file-level association with relative ease. However, portion-level association requires a more careful review of the online media, so that the user may identify which portions of the media file to associate with the metadata. In both cases, where user wishes to associate metadata that exists elsewhere (e.g., a separate file), the user must locate the metadata prior to establishing the association. Examples of the types of metadata that are often associated with online media include documents, news articles, advertisements, thumbnails, images, hyperlinks to related media file content, hyperlinks to other portions of the same media file, hyperlinks of related text content, and embedded textual content.

After the association has been established, many online media players will present the metadata to a viewer during playback of the online media. For example, a professor at an educational institution may produce a marked up a series of online video lectures with resources that will enhance students' understanding of the subject area. This might include embedded definitions of terms, links to on-line documents that relate to particular topics discussed in a lecture, or cross-references to sections of other lectures in a series. Having these resources appear at the appropriate time during the lecture playback will enhance their usefulness.

Or, a business may publish on its web site promotional videos which discuss a number of different products. As each product is discussed, it would benefit the consumer to be able to access product-specific documentation, press releases, news articles, and usage stories. The viewer of the promotional video would then be able to interact with the video playback much like a web page, following hyperlinks to these related resources at the appropriate times during playback.

SUMMARY

Some aspects disclosed herein provide a facility for associating metadata with media. For example, some embodiments provide for computer systems and computer-implemented methods that associate metadata with media files in a manner that allows media players to provide access to the associated metadata at times when media content relevant to the metadata is being played by the media player. One such system is provided by 3Play Media of Cambridge, Mass. The 3Play Media system accepts media files uploaded by users who wish to have synchronized (e.g., time-coded) transcriptions produced for each file. The 3Play Media system processes these files using an automatic speech recognition component to create a preliminary synchronized textual transcription of the audio in the media file. In addition, the 3Play Media system provides a transcription editing platform that optimizes correction of automatic speech recognition output to create a high-quality transcription. This platform provides authorized editors with access to the automatic speech recognition drafts and media files associated with the drafts via a 3Play Media server. While the editor remains authorized, the platform processes edits made by the editor to the speech recognition output, including word corrections, format corrections, synchronization modifications, and speaker identification. The platform can also store the corrected transcription on the 3Play Media server.

Some examples of the 3Play Media system also provide a user interface that is configured to receive requests from an authorized user (e.g., a user or an editor) to associate metadata with a media file. While the user remains authorized, the user interface may facilitate association of the metadata with the media file via the synchronized transcription of the media file, and may store associated metadata in conjunction with the media file. Further, according to these examples, as the user locates and associates particular portions of metadata with a media file, the user interface records the metadata within a metadata library for the user's reference and potential future use. This metadata library may be initially empty or may be pre-populated with metadata that is relevant to the content of the media file.

Thus at least some embodiments disclosed herein provide for associating a media file with synchronized metadata to facilitate a variety of applications. Additionally, in some embodiments, metadata association processes do not require a media file to be played during the association process, so that CPU, memory, and bandwidth requirements are significantly reduced. Further, embodiments disclosed herein are amenable to combinations of manual intervention and automation, so that a user may decide on the appropriate tradeoff between supervision and cost. According to at least one embodiment, a system for associating metadata with at least one media file is provided. The system includes a memory storing transcription information associated with the at least one media file, at least one processor coupled to the memory, and a component executed by the at least one processor and configured to associate metadata with the at least one media file by storing an association between the transcription information and the metadata within the memory. In the system, the transcription information may be synchronized with the at least one media file and the association engine may be further configured to associate the metadata with a portion of the at least one media file by storing an association between a portion of the transcription information and the metadata.

In the system, the component may be further configured to retrieve the metadata from a metadata library stored in the memory. The component may also be further configured to retrieve the metadata from at least one of the system, a remote computer system in data communication with the system via a local network, and a remote computer system in data communication with the system via the internet, and store the metadata in the metadata library. The metadata may include at least one of a uniform resource locator, a document, and an action.

In the system, the component may include an association engine configured to automatically build the metadata library. The association engine may be further configured to automatically associate the metadata with the at least one media file.

In the system, the component may include a user interface configured to execute a process, conducted by a user, to build the metadata library. The user interface may be further configured to execute a process, conducted by the user, to associate the metadata with the at least one media file.

According to another embodiment, a method of associating metadata with at least one media file using a computer system is provided. The computer system includes a processor and memory storing transcription information associated with the at least one media file. The method includes an act of associating the metadata with the at least one media file by storing an association between the transcription information and the metadata within a memory.

The transcription information may be synchronized with the at least one media file and, in the method, the act of associating the metadata with the at least one media file may include an act of associating the metadata with a portion of the at least one media file by storing an association between a portion of the transcription information and the metadata. The act of associating the metadata with the at least one media file may include an act of retrieving the metadata from a metadata library stored in the memory.

The method may further include acts of retrieving the metadata from at least one of the computer system, a remote computer system in data communication with the method via a local network, and a remote computer system in data communication with the system via the internet and storing the metadata in the metadata library. The act of associating the metadata with the at least one media file may include an act of associating at least one of a uniform resource locator, a document, and an action with the at least one media file.

The method may further include an act of automatically building the metadata library. The method may further include automatically associating the metadata with the at least one media file. The method may further include executing a process, conducted by a user, to build the metadata library. The method may further include executing a process, conducted by the user, to associate the metadata with the at least one media file.

According to another embodiment, a non-transitory computer readable medium storing sequences of instructions for performing a process of associating metadata with at least one media file is provided. The sequences include instructions, executable by at least one processor of a computer system, that instruct the computer system to associate the metadata with the at least one media file by storing an association between the transcription information and the metadata within a memory of the computer system.

The transcription information may be synchronized with the at least one media file and the instructions may further instruct the at least one processor to associate the metadata with a portion of the at least one media file by storing an association between a portion of the transcription information and the metadata. Still other aspects, embodiments and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIG. 12 is an illustration of a set of user interface elements configured to receive a selection of transcription information;

FIG. 13 is an illustration of a set of user interface elements in which a token is selected;

FIG. 14 is another illustration of a set of user interface elements in which a sequence of tokens is selected;

FIG. 15 is an illustration of a set of user interface elements configured to receive association requests referencing URL metadata;

FIG. 16 is an illustration of a set of user interface elements configured to receive association requests referencing document metadata;

FIG. 22 is an example XML structure storing transcription information.

DETAILED DESCRIPTION

Figure 1:
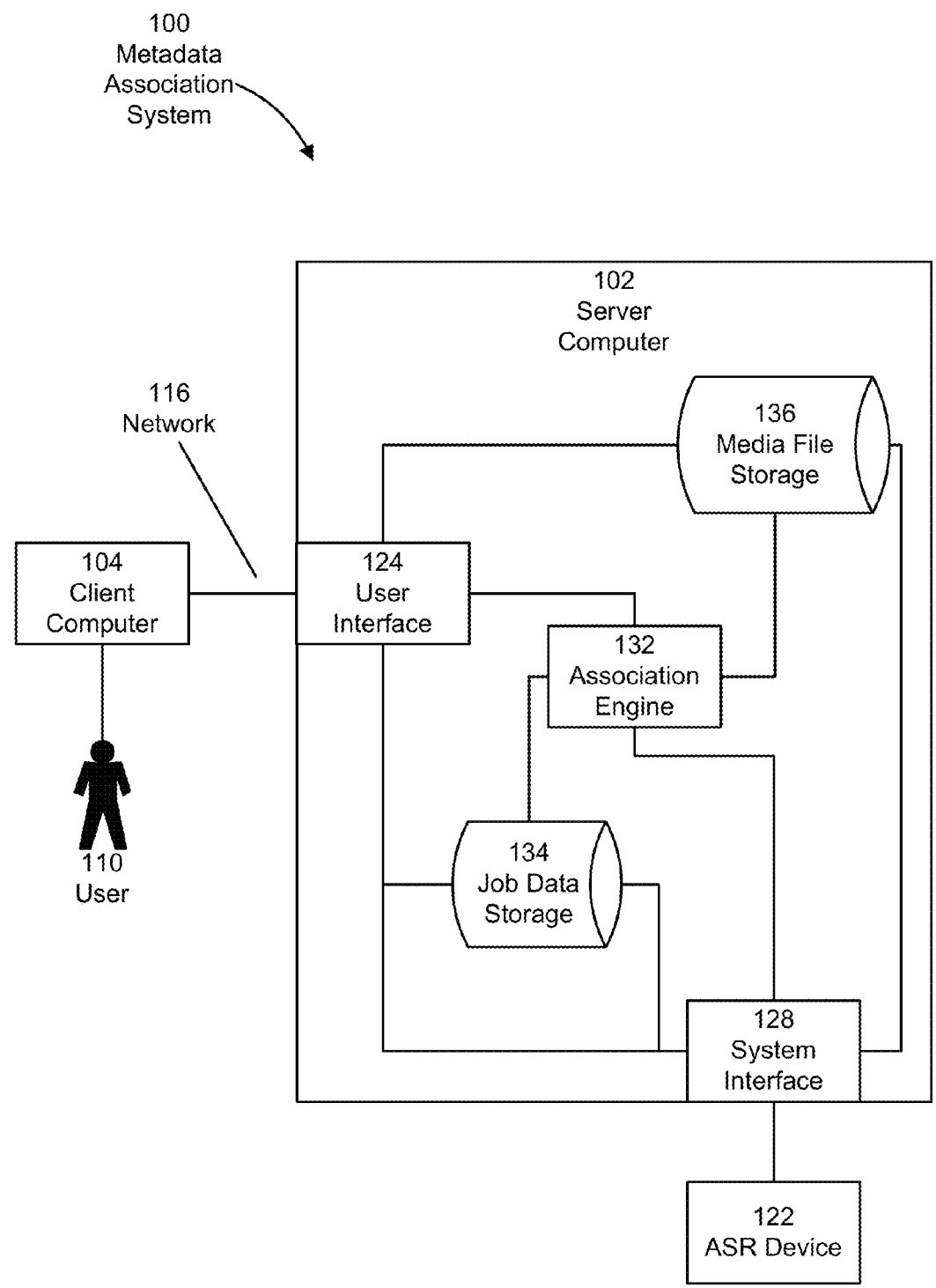
FIG. 1 is a context diagram including an exemplary metadata association system.

Some embodiments disclosed herein include apparatus and processes for associating metadata with a media file, or portions thereof, via a synchronized (e.g. time-coded or frame-coded) transcription of the media file. For example, according to one embodiment, a user interface is configured to receive a request to initiate a metadata association session with a user. The request may include an indication of the media file with which the user wishes to associate metadata. In response to receipt of this session request, the user interface reads transcription information from a synchronized transcription file and provides a plurality of interface elements through which the user interface receives one or more requests to associate metadata with the transcription information. In response to receipt an association request, the user interface stores an association of the metadata with the transcription information. During playback of the media, the metadata may be rendered with the portion of the media corresponding to the transcription information with which the metadata is associated.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Metadata Association System

Various embodiments utilize one or more computer systems to implement a metadata association system that is configured to receive media files from users and to generate metadata associations between the media files and a variety of metadata. FIG. 1 illustrates one of these embodiments, a metadata association system 100. As shown, FIG. 1 includes a server computer 102, client computer 104, a user 110, network 116, and an automatic speech recognition ("ASR") device 122. The server computer 102 includes several components: a user interface 124, a system interface 128, an association engine 132, job data storage 134, and a media file storage 136.

As shown in FIG. 1, the system interface 128 exchanges (i.e. sends or receives) media file information with the ASR device 122. The user interface 124 exchanges information with the client computer 104 via the network 116. The network 116 may include any communication network through which computer systems may exchange information. For example, the network 116 may be a public network, such as the internet, and may include other public or private networks such as LANs, WANs, extranets and intranets.

Information may flow between the components illustrated in FIG. 1, or any of the elements, components and subsystems disclosed herein, using a variety of techniques. Such techniques include, for example, passing the information over a network using standard protocols, such as TCP/IP or HTTP, passing the information between modules in memory and passing the information by writing to a file, database, data store, or some other non-volatile data storage device. In addition, pointers or other references to information may be transmitted and received in place of, in combination with, or in addition to, copies of the information. Conversely, the information may be exchanged in place of, in combination with, or in addition to, pointers or other references to the information. Other techniques and protocols for communicating information may be used without departing from the scope of the examples and embodiments disclosed herein.

In some embodiments illustrated by FIG. 1, the metadata association system 100 receives media files, and other information, from the user 110 via the user interface 124. The user 110 may be a customer of an electronic transcription job market, such as the customer 110 described in FIG. 1 of co-pending U.S. patent application Ser. No. 13/246,123, entitled "ELECTRONIC TRANSCRIPTION JOB MARKET," ("the '123 Application") which is hereby incorporated herein by reference in its entirety. Further, in some embodiments, the user interface 124 may incorporate, or be incorporated into, the customer interface 124 or the editor interface 126 described in FIG. 1 of the '123 Application.

In some embodiments, the user interface 124 is configured to provide an interface to the user 110 via the network 116 and the client computer 104. For instance, in one embodiment, the user interface 124 is configured to serve a browser-based user interface to the user 110 that is rendered by a web-browser running on the client computer 104. In this embodiment, the user interface 124 exchanges information with the user 110 via this user interface and stores the exchanged information within the job data storage 134 or the media file storage 136. Examples of information stored in the media file storage 136 include media files, transcription files, and metadata files. Examples of information stored in the job data storage 134 include information descriptive of metadata, media files, users, projects, and transcriptions. Information descriptive of metadata may include indications that the metadata is preferred or required to be referenced in associations with media files within a project or supplied by an identified user. This predefined metadata may be utilized by the association engine 132 or users of the metadata association system, such as the user 110. Both the job data storage 134 and the media file storage 136 are described further below with reference to FIG. 2.

In other embodiments, the user interface 124 is configured to perform a variety of processes in response to exchanging particular information via the client computer 104. For instance, in one embodiment, after receiving one or more media files via the client computer 104, the user interface 124 provides the association engine 132 with an identifier of newly stored, unprocessed media files. In other embodiments, after receiving one or more media files via the client computer 104, the user interface 124 issues a request for ASR processing to the system interface 128.

In another example illustrated by FIG. 1, the user interface 124 receives media file information from the client computer 104. This media file information may include a media file, information identifying a knowledge domain to which the content included in the media file belongs, and information describing a project to be associated with the media file and from which the knowledge domain may be derived. A project is a set of media files grouped by a user according to domain or other media file attribute. Responsive to receipt of this media file information, the user interface 124 stores any media files included in the media file information in the media file storage 136, stores unique identifiers of these media files in the job data storage 134, stores any project information included in the media file information in the job data storage 134, and stores any knowledge domain information included in the media file information (or derived from the project information) in the job data storage 134.

According to another example illustrated by FIG. 1, the user interface 124 provides media file information to the client computer 104. This media file information includes unique identifiers of one or more media files previously received from the user 110 and the project information associated with the received media files. In this example, the user interface 124 receives modifications to the provided media file information made by the user 110 via the client computer 104. Responsive to receiving the modifications, the user interface 124 stores the modifications in the job data storage 134 and the media file storage 136.

In other embodiments, the user interface 124 is configured to facilitate a metadata association process conducted by the user 110. When executing in this configuration, the user interface 124 may interact with the association engine 132, the job data storage 134, the media file storage 136, and the system interface 128. An example of one such metadata association process is described further below with reference to FIG. 4. An exemplary configuration of user interface elements presented during execution of the metadata association process is described further below with reference to FIG. 9.

Figure 9:
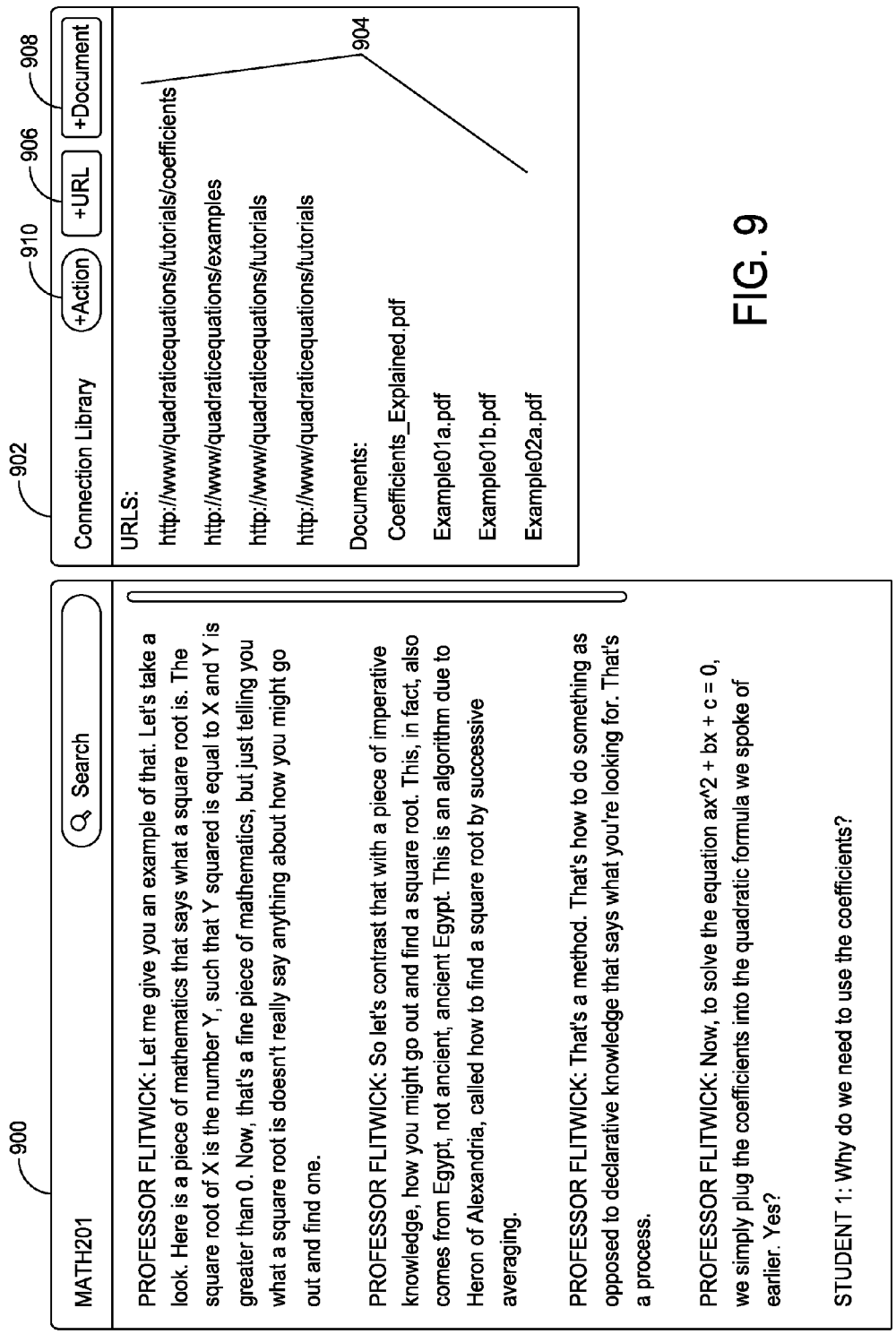
FIG. 9 is an illustration of a set of user interface elements configured to receive association requests and metadata library requests.

As shown, FIG. 9 includes a transcription data window 900 and a metadata library window 902. The metadata library window 902 includes metadata elements 904, an add URL button 906, an add document button 908, and an add action button 910. Both the transcription data window 900 and the metadata library window 902 are configured to present output and receive input via mechanisms known in the art. For example, both of the windows 900 and 902 can present information via an output device (e.g. a display screen) and can receive information via an input device (e.g. a mouse, keyboard, or the like).

In the embodiment shown in FIG. 9, the user interface 124 is configured to present transcription information corresponding to a media file with which metadata is to be associated within the transcription data window 900. In addition, the user interface 124 is configured to receive association requests via the transcription window 900. When executing according to this configuration, the user interface 124 receives these association requests as user input located within the transcription window 900. The association request may include information descriptive of the transcription information that the user wishes to associate with metadata (e.g., tokens or whitespace currently selected within the transcription window 900) and information identifying the metadata to be associated with the transcription information (e.g. metadata element identifiers currently selected in the metadata library window 902). In response to receiving the association request, the user interface 124 creates an association between the transcription information and the metadata and stores the association within the transcription information.

Figure 10:
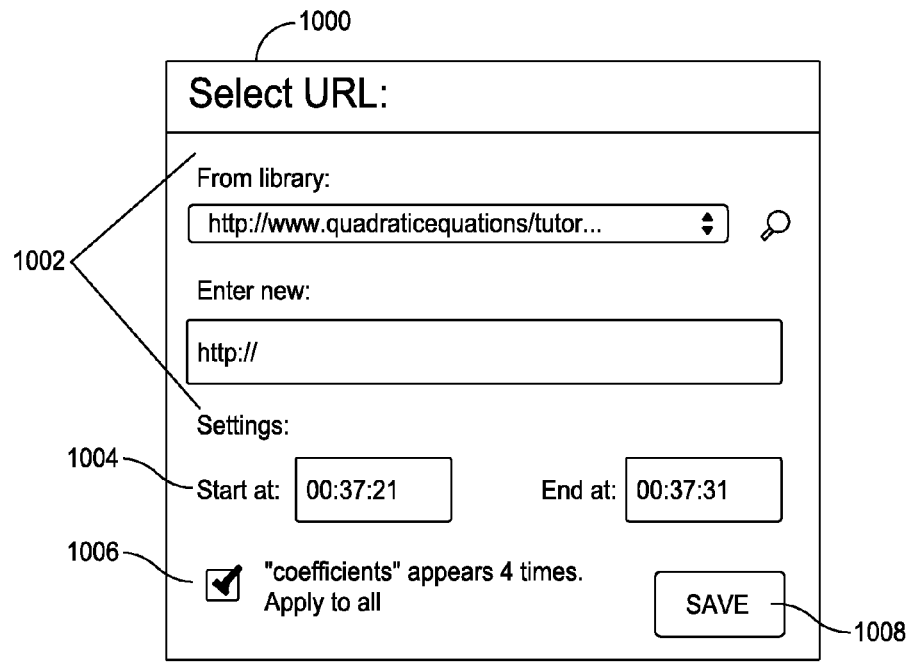
FIG. 10 is an illustration of a set of user interface elements configured to receive association requests referencing URL metadata.
Figure 11:
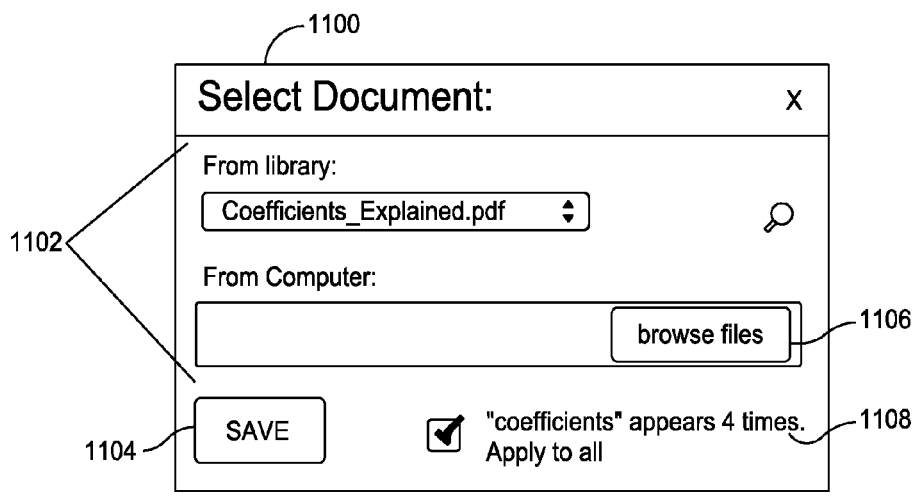
FIG. 11 is an illustration of a set of user interface elements configured to receive an association request referencing document metadata.
Figure 20:
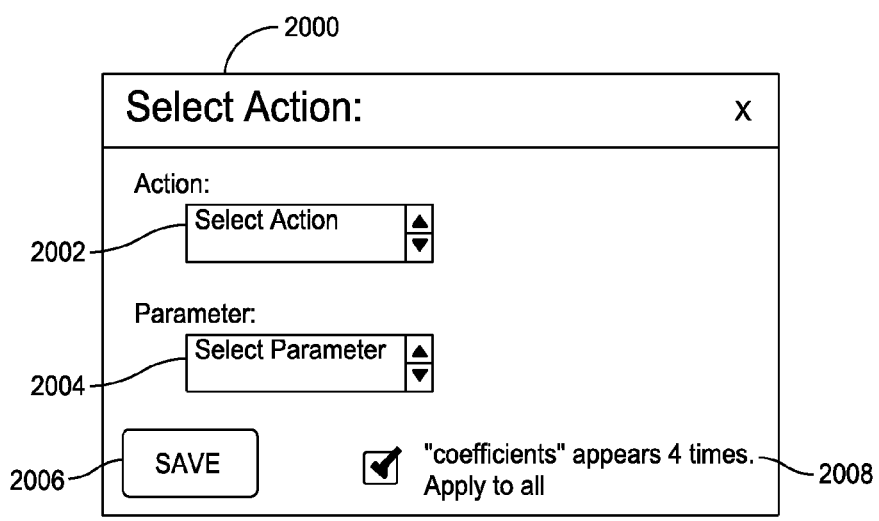
FIG. 20 is an illustration of a set of user interface elements configured to receive association requests referencing action metadata.

Further, in the embodiment shown, the user interface 124 is configured to present information indicating metadata elements available for association with the transcription information within the metadata library window 902. In addition, the user interface 124 is configured to receive requests to add additional metadata elements to the metadata library via the metadata library window 902. When executing according to the configuration of this embodiment, the user interface 124 receives requests to add metadata elements as user input indicating selection of the add URL button 906, the add document button 908, or the add action button 910. In response to receiving a request to add an element of metadata, the user interface 124 presents additional elements through which the user interface 124 receives metadata information descriptive of the location and characteristics of the metadata. FIGS. 10, 11 and 20 illustrate examples of elements presented by the user interface 124 to collect this metadata information for URLs, documents and actions, respectively. Although these examples focus on URLs, documents and actions, the embodiments disclosed herein are not limited to associating only URLs, documents, and actions with media. Rather, embodiments disclosed herein may associate a wide variety of metadata with media.

FIG. 10 illustrates one example of a URL dialog 1000 that includes URL selection options 1002, synchronization information 1004, global association checkbox 1006, and a save button 1008. According to this embodiment, the user interface 124 is configured to receive a selected URL via the URL selection options 1002. As shown, the URL may be newly entered, or selected from URLs included in the metadata library. In addition, in the embodiment shown, the user interface 124 is configured to display a preview of the URL in response to the user selecting the magnifying glass icon included in the selection options 1002. Further, according to this embodiment, the user interface 124 is configured to present and receive synchronization information in the form of start and end times via the synchronization information elements 1004. In some embodiments, the default values presented for in synchronization information elements 1004 are set to the values of the synchronization information associated with any transcription information currently selected in the transcription window 900. Although the embodiment illustrated in FIG. 10 presents the synchronization information in the form of a start time and an end time, the embodiments disclosed herein are not limited to presenting synchronization information in this way. For instance, in other embodiments, the user interface 124 presents the synchronization information in the form of a start time and a duration. According to the embodiments disclosed herein, the user may modify the synchronization information associated with transcription information, for example, where the default duration is not considered to be sufficient.

Also, according to this embodiment, the user interface 124 is configured to receive an indication of whether or not to perform a global or local association via the global association checkbox 1006. A global association associates the selected URL with all of the tokens included within the transcription information that match the tokens within the currently selected transcription information. A local association associates the selected URL with the currently selected transcription information. In addition, according to this embodiment, the user interface 124 is configured to store an association with the characteristics specified within the dialog 1000 when the user selects the save button 1008. In some embodiments, the association is stored within the transcription information. In other embodiments, the user interface 124 is configured to store the selected URL in the metadata library for future reference.

FIG. 11 illustrates one example of a document dialog 1100 that includes document selection options 1102, a save button 1104, a browse files button 1106, and a global association checkbox 1006. According to this embodiment, the user interface 124 is configured to receive a selected document via the document selection options 1102. As shown, the document may be selected from documents included in the metadata library or selected from another source via the browse button 1106, which opens another dialog (not shown) to facilitate selection of a document. In addition, in the embodiment shown, the user interface 124 is configured to display a preview of the URL in response to the user selecting the magnifying glass icon included in the selection options 1102.

Also, according to this embodiment, the user interface 124 is configured to receive an indication of whether or not to perform a global or local association via the global association checkbox 1108. A global association associates the selected document with all of the tokens included within the transcription information that match the tokens within the currently selected transcription information. A local association associates the selected document with the currently selected transcription information. In addition, according to this embodiment, the user interface 124 is configured to store an association with the characteristics specified within the dialog 1100 when the user selects the save button 1104. In some embodiments, the association is stored within the transcription information. In other embodiments, the user interface 124 is configured to store the selected document in the metadata library for future reference.

FIG. 20 illustrates one example of a document dialog 2000 that includes document an action combo box 2002, a parameter combo box 2004, a save button 2006, and a global association checkbox 2008. According to this embodiment, the user interface 124 is configured to receive information identifying a selected action via the action combo box 2002. According to the embodiment shown, an action includes an automated process that is executed during playback of the media file. These automated processes may require parameters such as those discussed further below with reference to the parameter combo box 2004. As with other forms of associated metadata, actions are provided during playback of the media file at a location specified by the synchronization information associated with the transcription information with which the action is associated. Examples of actions include executing an application that interacts with the user (such as a quiz directed to the content of the media file), pausing playback of a currently playing portion of the media file for a period of time, displaying text at a position on or near the position of the media playback, playing a portion of the media file (or another media file) that is different from the current portion prior to resuming playback of the current portion after playback of the different portion is complete.

Further, according to this embodiment, the user interface 124 is configured to receive information descriptive of parameters of the selected action via one or more parameter combo boxes, such as the parameter combo box 2004. The parameter information may specify additional information needed to properly execute the selected action. For example, according to one embodiment, where the action information specifies execution of an interactive application, the parameter information specifies the particular interactive application to execute; where the action information specifies a pause in playback, the parameter information specifies the period of time to pause; where the action information specifies displaying text, the parameter information specifies the source of the text (user entered, generated captions, etc.), the display position of the text, the style of the text (font type, size, wrapping options, etc.), the language in which the text should be displayed (English, Chinese, Spanish, etc.); and where the action information specifies play a different portion of a media file, the parameter information identifies the different portion.

Also, according to this embodiment, the user interface 124 is configured to receive an indication of whether or not to perform a global or local association via the global association checkbox 2008. A global association associates the selected action with all of the tokens included within the transcription information that match the tokens within the currently selected transcription information. A local association associates the selected action with the currently selected transcription information. In addition, according to this embodiment, the user interface 124 is configured to store an association with the characteristics specified within the dialog 2000 when the user selects the save button 2006. In some embodiments, the association between the media file and the metadata is stored within the transcription information. Additionally, in at least one embodiment, the user interface 124 is configured to store the selected action in the metadata library associated with the media file for future reference. The metadata library may be stored within the transcription information or may be stored separately from the transcription information.

It is to be appreciated that at least some of the user interface elements described above with reference to FIGS. 10, 11 and 20 are optional. For example, dialog 1100 does not include synchronization information. Other user interface elements may be removed or added without departing from the scope of the embodiments disclosed herein.

Figure 21:
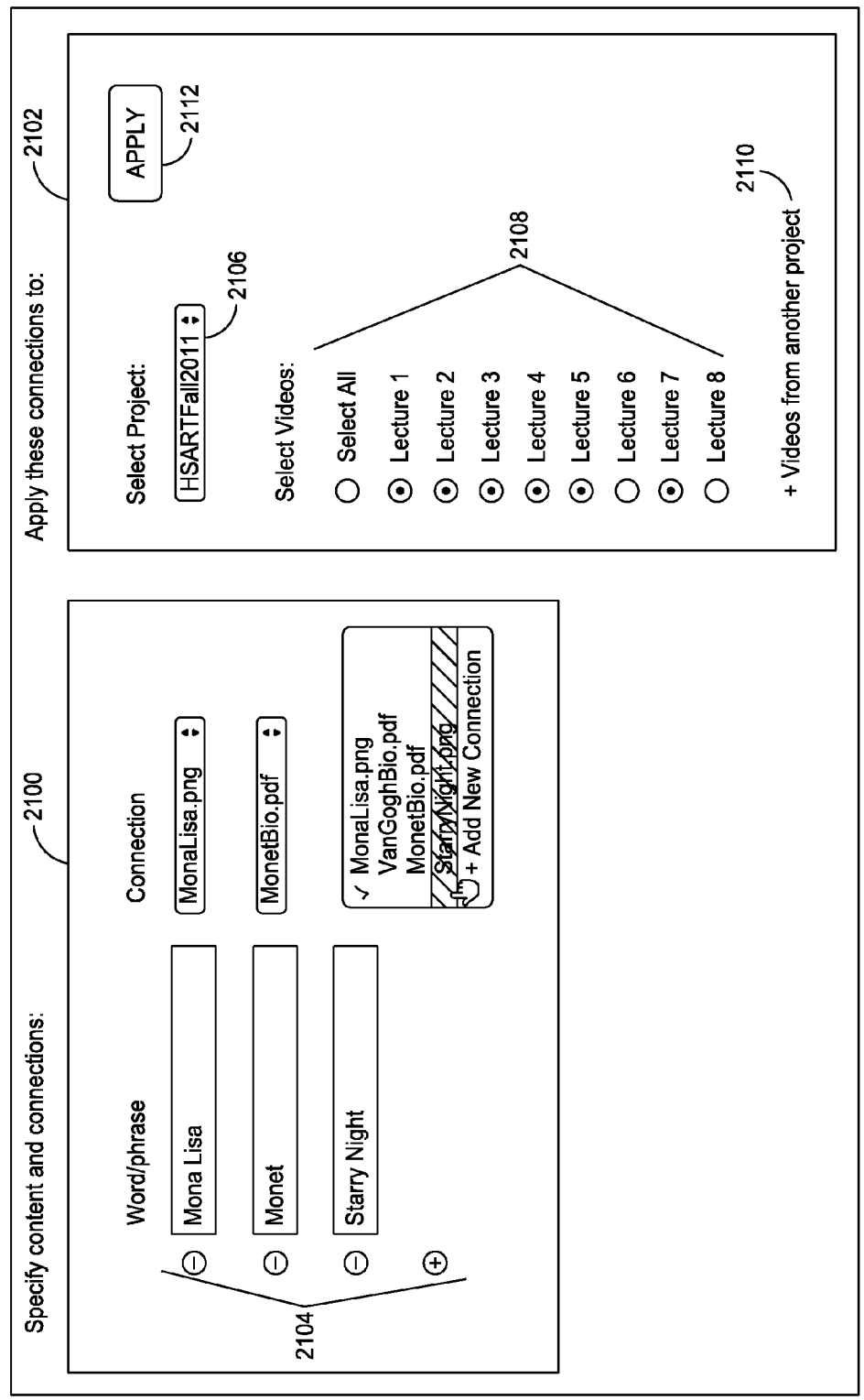
FIG. 21 is an illustration of a set of user interface elements configured to receive association requests for a plurality of media files.

In other embodiments, the user interface 124 is configured to provide a set of user interface elements through which the user interface 124 receives metadata association requests for a plurality of media files. FIG. 21 illustrates an example of one such set of user interface elements. As shown, FIG. 21 includes an association window 2100 and a media file window 2102. The association window 2100 includes one or more association elements 2104. The media file window 2102 includes a project combo box 2106, media file radio buttons 2108, additional project element 2110, and apply button 2112. Both the association window 2100 and the media file window 2102 are configured to present output and receive input via mechanisms known in the art. For example, both of the windows 2100 and 2102 can present information via an output device (e.g. a display screen) and can receive information via an input device (e.g. a mouse, keyboard, or the like).

In the embodiment shown in FIG. 21, the user interface 124 is configured to receive information identifying transcription information and metadata selected to be associated with the transcription information via the association window 2100. As shown in FIG. 21, each association element 2104 includes a text box and a combo box. The text box receives text entered by the user 110 that identifies one or more tokens of transcription information. The combo box presents metadata available for selection from one or more metadata libraries and receives an element of metadata selected by the user 110. Each association element 2104 represents a potential association between identified tokens and the selected metadata.

Further, in the embodiment shown, the user interface 124 is configured to present one or more media files targeted for the associations specified in the associations window 2100. When executing according to this configuration, the user interface 124 receives requests to add media files from additional projects via the additional project element 2110. In response to receiving an additional project request, the user interface 124 presents a project combo box, such as the project combo box 2106. Upon receipt of a selected project via the project combo box 2106, the user interface 124 presents radio buttons, such as the radio buttons 2108, that represent the media files associated with the selected project. Further, in response to receiving user input indicating selection of the apply button 2112, the user interface 124 records associations between the media files selected via the radio buttons 2108 and the metadata selected in each association element 2104 based on the texted entered into each association element 2104. More specifically, the user interface records these associations where the transcription information synchronized with the selected media files includes tokens identified by the entered text corresponding to the selected metadata listed in each association element 2104.

In other embodiments, the user interface 124 is configured to facilitate a metadata library building process conducted by the user 110. When executing in this configuration, the user interface 124 may interact with the job data storage 134. An example of one such metadata library building process is described further below with reference to FIG. 6.

Although the examples described above focus on a web-based implementation of the user interface 124, embodiments are not limited to a web-based design. Other technologies, such as technologies employing a specialized, non-browser based client, may be used to implement the user interface without departing from the scope of the aspects and embodiments disclosed herein. For instance, according to one embodiment, the user interface 124 is a simple, locally executed upload client that allows the user to do nothing more than upload media files to the server via FTP or some other protocol.

In various embodiments illustrated within FIG. 1, the association engine 132, in executing according to its configuration, exchanges information with the user interface 124, the system interface 128, the job data storage 134, and the media file storage 136. The exchanged information may include any information used by the metadata association system 100 to associate metadata with media files. Specific examples of exchanged information include metadata, media file information, user information, project information, and transcription information.

According to another embodiment, the system interface 128 is configured to receive requests for ASR processing. These ASR requests may include information identifying a media file and a set of parameters that indicate language, acoustic, and formatting models appropriate for the media file. According to this embodiment, the system interface 128 is also configured to, in response to receiving the ASR requests, provide the unprocessed media files and the set of parameters to the ASR device 122. In this embodiment, the ASR device 122 is configured to receive the media file, perform automatic speech recognition on the media file and store draft transcription information that includes a draft transcription of the content of the media file. The draft transcription information may also include synchronization information, such as time-coding or frame-coding, that associates tokens included in the draft transcription with particular portions of the received media file. In some embodiments, the synchronization information for each token is represented as frame offsets into a feature vector sequence extracted from the media file at a constant sampling rate (e.g., 100 feature vectors per second) during ASR processing. The frame offsets are tracked throughout the ASR and editing process as a basis of maintaining synchronization. Such methods of maintaining synchronization information are well known in the art.

In some embodiments, the system interface 128 is further configured to receive the draft transcription information from the ASR device 112, store the draft transcription information in the job data storage 134 and the media file storage 136, and notify the association engine 132 of the availability of the draft transcription information.

In some embodiments, the association engine 132 is configured to identify unprocessed transcription information stored in the job data storage 134 and the media file storage 136. In some of these embodiments, the association engine 132 identifies unprocessed transcription information after receiving an indication of the storage of one or more unprocessed transcriptions from another component, such as the user interface 124 or the system interface 128 described above. In others of these embodiments, the association engine 132 identifies unprocessed transcription information by periodically executing a query, or some other identification process, that identifies new, unprocessed transcriptions by referencing information stored in the job data storage 134 or the media file storage 136.

In at least one embodiment, the association engine 132 is configured to perform a variety of processes in response to identifying unprocessed transcription information or in response to receiving a notification identifying unprocessed transcription information that is available. For instance, in one embodiment, after identifying that unprocessed draft transcription information is available, the association engine 132 determines whether a professionally edited version of the draft transcription is available. If so, the association engine 132 uses the transcription information that includes the professionally edited version of the draft transcription to generate metadata libraries or metadata associations as described further below. If not, the association engine 132 either uses the transcription information that includes the ASR-generated version of the draft transcription to generate metadata libraries or metadata associations, or defers generation of metadata libraries or metadata associations until a professionally edited version becomes available.

According to various embodiments illustrated by FIG. 1, the association engine 132 is configured to process requests to build a metadata library for a media file or a project. A build request may include information that identifies a set of media files and one or more sources of metadata that may be included in the metadata library. The set of media files may include one or more media files spanning one or more projects. In these embodiments, the association engine 132 is configured to, in response to identifying a build request, execute a metadata library building process. One example of a metadata library building process is described further below with reference to FIG. 7.

In another embodiment, the association engine 132 is configured to process requests to automatically associate metadata with a media file or a project. An automated association request may include information identifying a set of media files and one or more sources of metadata may be associated with the media file or the project. The set of media files may include one or more media files spanning one or more projects. In this embodiment, the association engine 132 is configured to, in response to identifying an automated association request, execute an automated association process. One example of an automated association process is described further below with reference to FIG. 8.

After this processing is complete, in some embodiments, the association engine 132 is configured to make finalized transcription information, which may include metadata associations and a metadata library, available to the user. The user may then download the finalized transcription information for his or her use via the user interface 124. The finalized transcription information and metadata library is also maintained in the media file storage 136 for reference and further processing, as discussed herein.

Each of the interfaces disclosed herein may both restrict input to a predefined set of values and validate any information entered prior to using the information or providing the information to other components. Additionally, each of the interfaces disclosed herein may validate the identity of an external entity prior to, or during, interaction with the external entity. These functions may prevent the introduction of erroneous data into the metadata association system 100 or unauthorized access to the metadata association system 100.

Figure 2:
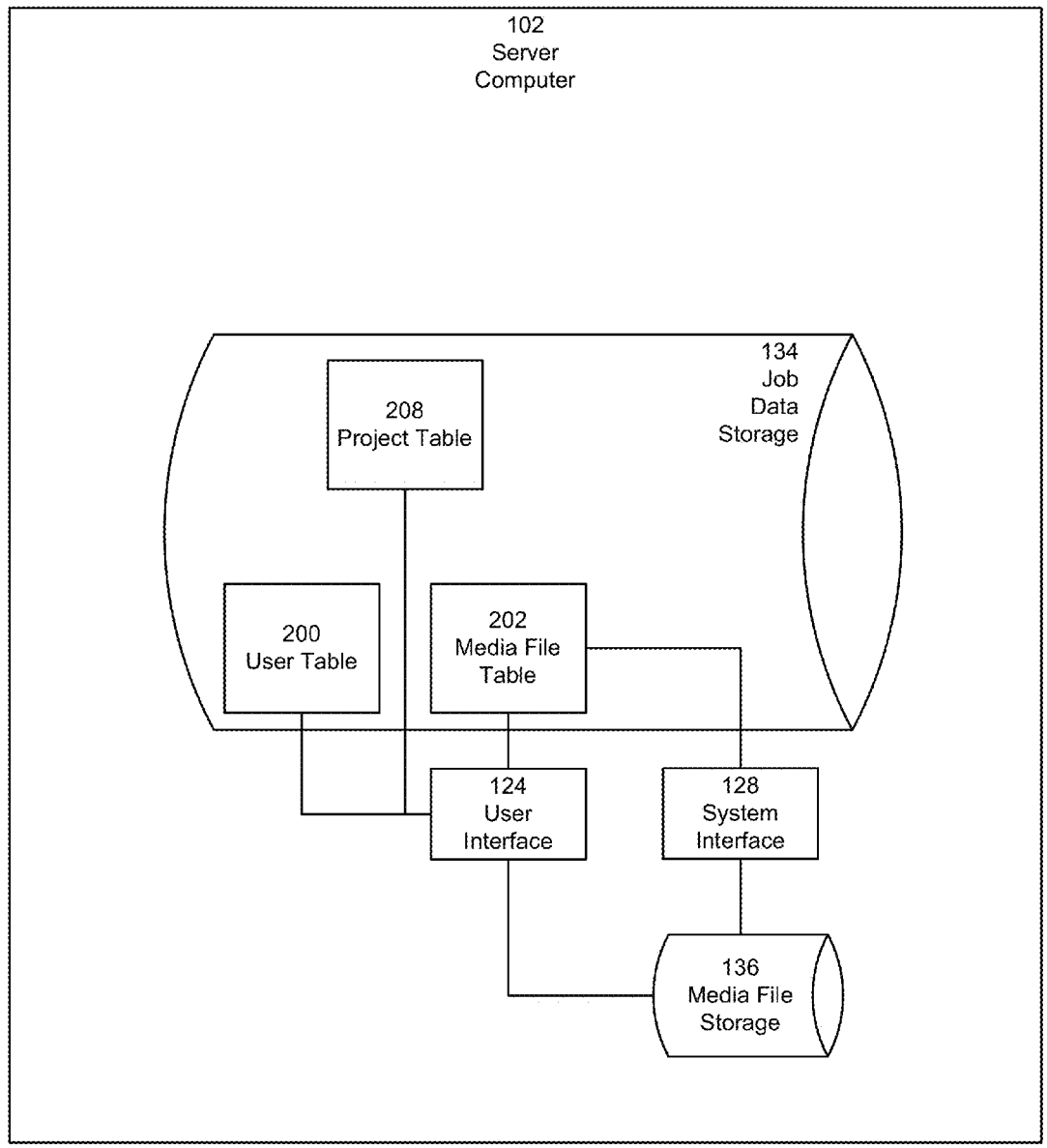
FIG. 2 is a schematic diagram of the server computer shown in FIG. 1, including data stores.

FIG. 2 illustrates the server computer 102 of FIG. 1 in greater detail. As shown in FIG. 2, the server computer 102 includes the job data storage 134, the user interface 124, the system interface 128, and the media file storage 136. In the embodiment illustrated in FIG. 2, the job data storage 134 includes a user table 200, a media file table 202, and a project table 208.

In the embodiment illustrated in FIG. 2, the media file storage 136 includes a file system configured to store media files, transcription files, and metadata files and acts as a file server for other components of the metadata association system. In another embodiment, the media file storage 136 includes identifiers for files stored on another computer system configured to serve files to the components of the metadata association system.

In some embodiments, metadata files include information identifying a media file or a project with which the metadata file is associated, identifiers of each metadata element included in one or more metadata libraries stored in the metadata file, and copies or references to each element of metadata included in each metadata library. In other embodiments, metadata libraries are stored with other transcription information within transcription files, which are described further below. Thus embodiments are not limited to a particular grouping of metadata information or set of predefined file types.

In other embodiments, transcription files include information descriptive of a synchronized transcription of the content included in a media file. A synchronized transcription is comprised of a textual representation of the content of the media file, where each token is associated with indicia of the location in the media file (i.e. portion of the media file) in which it applies. The tokens may include words, numerics, punctuation, speaker identification, formatting directives, non-verbal annotations (such as [BACKGROUND NOISE], [MUSIC], [LAUGHTER], [PAUSING]) and other markings or text that may be useful in describing the media file content. The empty string may also be used as a token, in which case the location indicia serves to keep the transcription synchronized with the media file content in the absence of useful textual information. In the case of a transcription from the ASR device, these empty-string tokens may be used if the ASR process was confident that some transcription-worthy event has occurred at that location, but is unsure of the particular identity of that event. In this case, having the location indicia associated with the event facilitates synchronized correction. In at least some embodiments, at least some of this transcription information is stored in the media file storage 136 as a transcription file. Table 1 illustrates one example of time-coded transcription information:

TABLE 1

| Caption Text | Begin Time | End Time |
| --- | --- | --- |
| Our | 0.0 | 0.2 |
| hospital | 0.2 | 0.55 |
| is | 0.55 | 0.66 |
| an | 0.66 | 0.70 |
| academic | 0.70 | 1.15 |
| teaching | 1.15 | 1.73 |
| facility, | 1.73 | 2.36 |
| serving | 2.36 | 2.81 |
| the | 2.81 | 2.94 |
| greater | 2.94 | 3.27 |
| Toronto | 3.27 | 3.75 |
| area. | 3.75 | 4.50 |
|  | 4.50 | 5.00 |
| We | 5.00 | 5.50 |
| were | 5.50 | 5.83 |
| founded | 5.83 | 6.02 |
| in | 6.02 | 6.46 |
| 1952 | 6.46 | 6.95 |
| and | 6.95 | 7.27 |
| have | 7.27 | 8.11 |
| 450 | 8.11 | 8.25 |
| beds. | 8.25 | 9.11 |
| [SILENCE] | 9.11 | 9.50 |

In some embodiments, transcription information includes text and timing information (e.g., begin time and end time) relative to a predetermined location (e.g., the start) within the media. The timing information indicates a portion within the media in which the text token is audible during playback. In the case where the timing information is associated with an empty string, such as the time interval 4.50-5.00 in Table 1, the timing information indicates a portion of the media in which no spoken word is audible. The annotation "[SILENCE]," as shown above in Table 1, may also be used to indicate a portion of the media in which no sound is audible. It is to be appreciated that the timing information is expressed in terms of indexes into the original digital media file, and thus is not an analog measurement. As a consequence, any associations made between a media file and metadata via transcription information will not suffer from asynchronization during playback due to CPU, memory or network bandwidth limitations.

The user table 200 stores information descriptive of the users of the metadata association system 100. In at least one embodiment, each row of the user table 200 stores information for a user and includes a user_id field, and a user_name field. The user_id field stores an identifier of the user that is unique within the metadata association system. The user_name field stores information that represents the user's name within the metadata association system. The user_id is used as a key by a variety of functions disclosed herein to identify information belonging to a particular user.

The media file table 202 stores information descriptive of the media files that have been uploaded to the metadata association system for processing. In at least one embodiment, each row of the media file table 202 stores information for one media file and includes the following fields: file_id, file_name, user_id, state, duration, domain, ASR_transcript_location, edited_transcript_location, and metadata_library_location. The file_id field stores a unique identifier of the media file. The file_name field stores the file system name of the media file. The user_id field stores a unique identifier of the user who provided the media file. The state field stores information that represents the state of the media file. The duration field stores information that represents the duration of the content of the media file. The domain field stores information that identifies a subject matter domain to which the media file belongs. The ASR_transcript_location field stores an identifier of a location of an ASR rendered transcription information associated with the media file. The edited_transcript_location field stores an identifier of a location of edited transcription information associated with the media file. The metadata_library_location field stores an identifier of a location of metadata library information associated with the media file. The file_id is used as a key by a variety of functions disclosed herein to identify information associated with a particular media file.

In the embodiment of FIG. 2, the project table 208 stores information descriptive of projects that the metadata association system is being utilized to complete. In at least one embodiment, each row of the project table 208 stores information for a project and includes an project_id field, a project_name field, a user_id field, a domain field, and a metadata_library_location field. The project_id field stores information that identifies a group of media files that belong to a project. The project_name field stores information that represents the project's name within the metadata association system. The user_id field indicates the user to whom the project belongs. The domain field stores information that identifies a subject matter domain of media files included in the project. The metadata_location field stores an identifier of a location of metadata library information associated with the media file. The project_id is used as a key by a variety of functions disclosed herein to identify information grouped into a particular project.

Information within the metadata association system 100, including data within the job data storage 134 and the media file storage 136, may be stored in any logical construction capable of holding information on a computer readable medium including, among other structures, file systems, flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance.

Various embodiments implement the components illustrated in FIG. 2 using a variety of specialized functions. For instance, according to some embodiments, the user interface 124 uses a File_Upload function and a File_Update function. The File_Upload function uploads a file stored on the client computer 104 to the server computer 102 and accepts parameters including user_id, project_id, filename, and optionally, domain. The user_id parameter identifies the user's unique user_id. The project_id identifies the project to which the media file belongs. The filename parameter specifies the name of the media file to be uploaded by the user interface 124. The domain parameter specifies the subject matter domain to which the media file belongs. In at least one embodiment, if the domain parameter is not specified, the user interface 124 determines the value of the domain parameter from the value of the domain field of a record stored within the project table 208 that has a project_id field that is equal to the project_id parameter.

In other embodiments, the File_Update function updates an attribute of a media file record and accepts parameters including file_id, attribute, and value. The file_id parameter identifies the media file record with attributes that will be modified as a result of execution of the File_Update function. The attribute parameter identifies an attribute to be modified. In at least one embodiment, this attribute may be the domain or state of the media file, as stored in the media file table 202. The value parameter specifies the value to which the attribute is to be set as a result of executing the File_Update function.

In other embodiments, the system interface 128 uses a File_Send_to_ASR function and a File_Create_Draft function. The File_Send_to_ASR function provides a media file to the ASR device 122 and causes the ASR device 122 to perform automatic speech recognition on the content included in the media file. The File_Send_to_ASR function accepts parameters including file_id. The file_id parameter identifies the media file to be processed by the ASR device 122.

In other embodiments, the File_Create_Draft function creates draft transcription information for a media file and accepts parameters including file_id and ASR_output. The file_id parameter identifies the media file for which the draft transcription information will be created by execution of the File_Create_Draft function. The ASR_output parameter specifies the location of the ASR output generated by the ASR device 122 during its processing of the media file.

In other embodiments, the File_Create_Metadata_Library function creates a metadata library from transcription information and accepts parameters including target_id and metadata_source. The target_id parameter identifies a set of media files for which the metadata library will be created by execution of the File_Create_Metadata_Library function. In some embodiments, the target_id is a project_id, a file_id, or a list including any combination of project_ids and file_ids. The metadata_source parameter specifies one or more sources of metadata that will be referenced during execution of the File_Create_Metadata_Library function. One example of the acts performed during execution of the File_Create_Metadata_Library function is described below with reference to FIG. 7.

In other embodiments, the File_Associate_Metadata function automatically associates metadata with a media file and accepts parameters including target_id and metadata source. The target_id parameter identifies a set of media files for which the metadata library will be created by execution of the File_Create_Metadata_Library function. In some embodiments, the target_id is a project_id, a file_id, or a list including any combination of project_ids and file_ids. The metadata_source parameter specifies one or more sources of metadata that will be referenced during execution of the File_Create_Metadata_Library function. One example of the acts performed during execution of the File_Associate_Metadata function is described below with reference to FIG. 8.

Embodiments of the metadata association system 100 are not limited to the particular configuration illustrated in FIGS. 1 and 2. Various examples utilize a variety of hardware components, software components and combinations of hardware and software components configured to perform the processes and functions described herein. In some examples, the metadata association system 100 is implemented using a distributed computer system, such as the distributed computer system described further below with regard to FIG. 3.

Computer System

As discussed above with regard to FIG. 1, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof.

Thus, aspects and functions may be implemented within methods, acts, systems, system elements and components using a variety of hardware and software configurations, and examples are not limited to any particular distributed architecture, network, or communication protocol.

Figure 3:
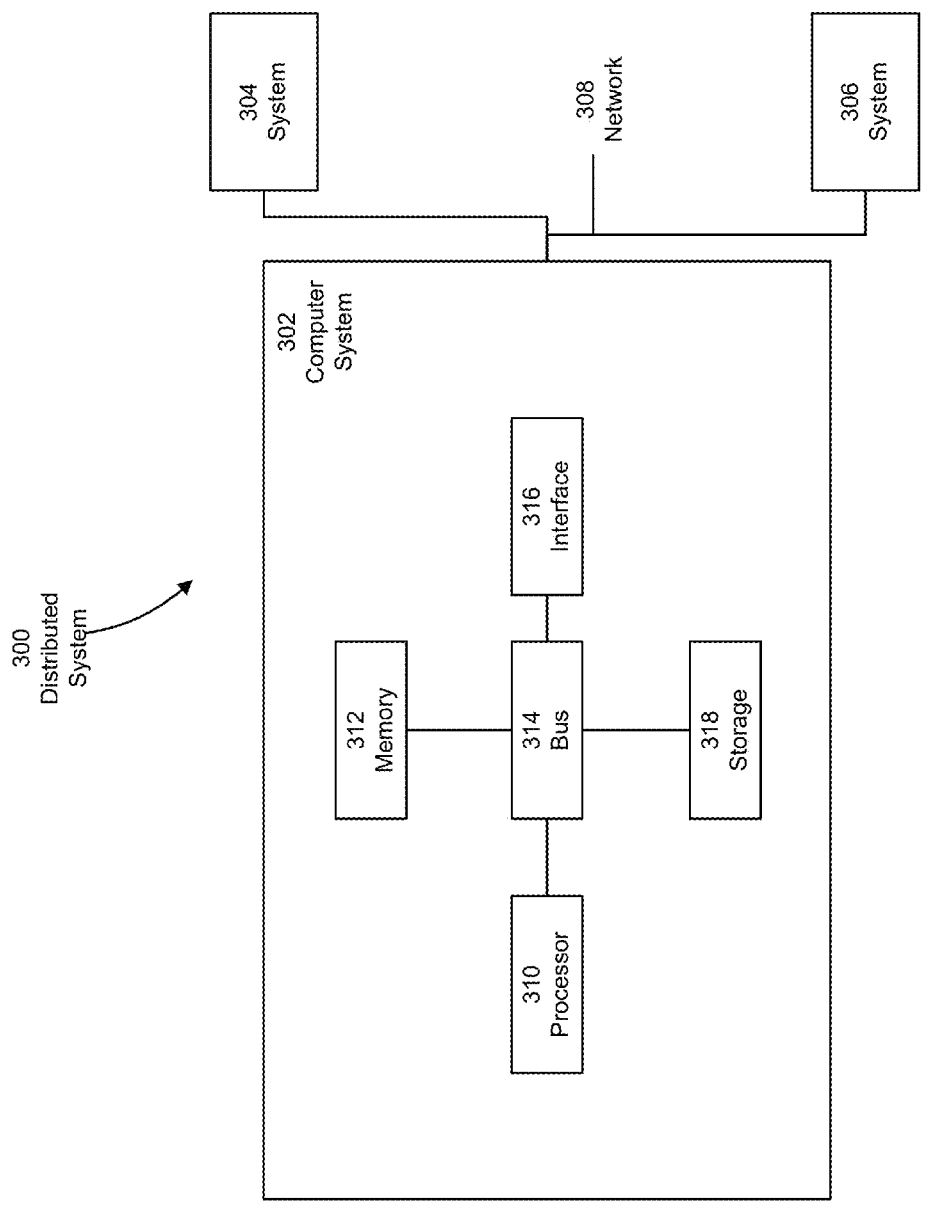
FIG. 3 is a schematic diagram of one example of a computer system that may perform processes and functions disclosed herein.

Referring to FIG. 3, there is illustrated a block diagram of a distributed computer system 300, in which various aspects and functions are practiced. As shown, the distributed computer system 300 includes one more computer systems that exchange information. More specifically, the distributed computer system 300 includes computer systems 302, 304 and 306. As shown, the computer systems 302, 304 and 306 are interconnected by, and may exchange data through, a communication network 308. The network 308 may include any communication network through which computer systems may exchange data. To exchange data using the network 308, the computer systems 302, 304 and 306 and the network 308 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 302, 304 and 306 may transmit data via the network 308 using a variety of security measures including, for example, TLS, SSL or VPN. While the distributed computer system 300 illustrates three networked computer systems, the distributed computer system 300 is not so limited and may include any number of computer systems and computing devices, networked using any medium and communication protocol.

As illustrated in FIG. 3, the computer system 302 includes a processor 310, a memory 312, a bus 314, an interface 316 and data storage 318. To implement at least some of the aspects, functions and processes disclosed herein, the processor 310 performs a series of instructions that result in manipulated data. The processor 310 may be any type of processor, multiprocessor or controller. Some exemplary processors include commercially available processors such as an Intel Xeon, Itanium, Core, Celeron, or Pentium processor, an AMD Opteron processor, a Sun UltraSPARC or IBM Power5+ processor and an IBM mainframe chip. The processor 310 is connected to other system components, including one or more memory devices 312, by the bus 314.

The memory 312 stores programs and data during operation of the computer system 302. Thus, the memory 312 may be a relatively high performance, volatile, random access memory such as a dynamic random access memory (DRAM) or static memory (SRAM). However, the memory 312 may include any device for storing data, such as a disk drive or other non-volatile storage device. Various examples may organize the memory 312 into particularized and, in some cases, unique structures to perform the functions disclosed herein. These data structures may be sized and organized to store values for particular data and types of data.

Components of the computer system 302 are coupled by an interconnection element such as the bus 314. The bus 314 may include one or more physical busses, for example, busses between components that are integrated within a same machine, but may include any communication coupling between system elements including specialized or standard computing bus technologies such as IDE, SCSI, PCI and InfiniBand. The bus 314 enables communications, such as data and instructions, to be exchanged between system components of the computer system 302.

The computer system 302 also includes one or more interface devices 316 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 302 to exchange information and to communicate with external entities, such as users and other systems.

The data storage 318 includes a computer readable and writeable nonvolatile, or non-transitory, data storage medium in which instructions are stored that define a program or other object that is executed by the processor 310. The data storage 318 also may include information that is recorded, on or in, the medium, and that is processed by the processor 310 during execution of the program. More specifically, the information may be stored in one or more data structures specifically configured to conserve storage space or increase data exchange performance. The instructions may be persistently stored as encoded signals, and the instructions may cause the processor 310 to perform any of the functions described herein. The medium may, for example, be optical disk, magnetic disk or flash memory, among others. In operation, the processor 310 or some other controller causes data to be read from the nonvolatile recording medium into another memory, such as the memory 312, that allows for faster access to the information by the processor 310 than does the storage medium included in the data storage 318. The memory may be located in the data storage 318 or in the memory 312, however, the processor 310 manipulates the data within the memory, and then copies the data to the storage medium associated with the data storage 318 after processing is completed. A variety of components may manage data movement between the storage medium and other memory elements and examples are not limited to particular data management components. Further, examples are not limited to a particular memory system or data storage system.

Although the computer system 302 is shown by way of example as one type of computer system upon which various aspects and functions may be practiced, aspects and functions are not limited to being implemented on the computer system 302 as shown in FIG. 3. Various aspects and functions may be practiced on one or more computers having a different architectures or components than that shown in FIG. 3. For instance, the computer system 302 may include specially programmed, special-purpose hardware, such as an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 302 may be a computer system including an operating system that manages at least a portion of the hardware elements included in the computer system 302. In some examples, a processor or controller, such as the processor 310, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 310 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used. Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g. specialized hardware, executable code, data structures or objects, that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Metadata Association Processes

Figure 4:
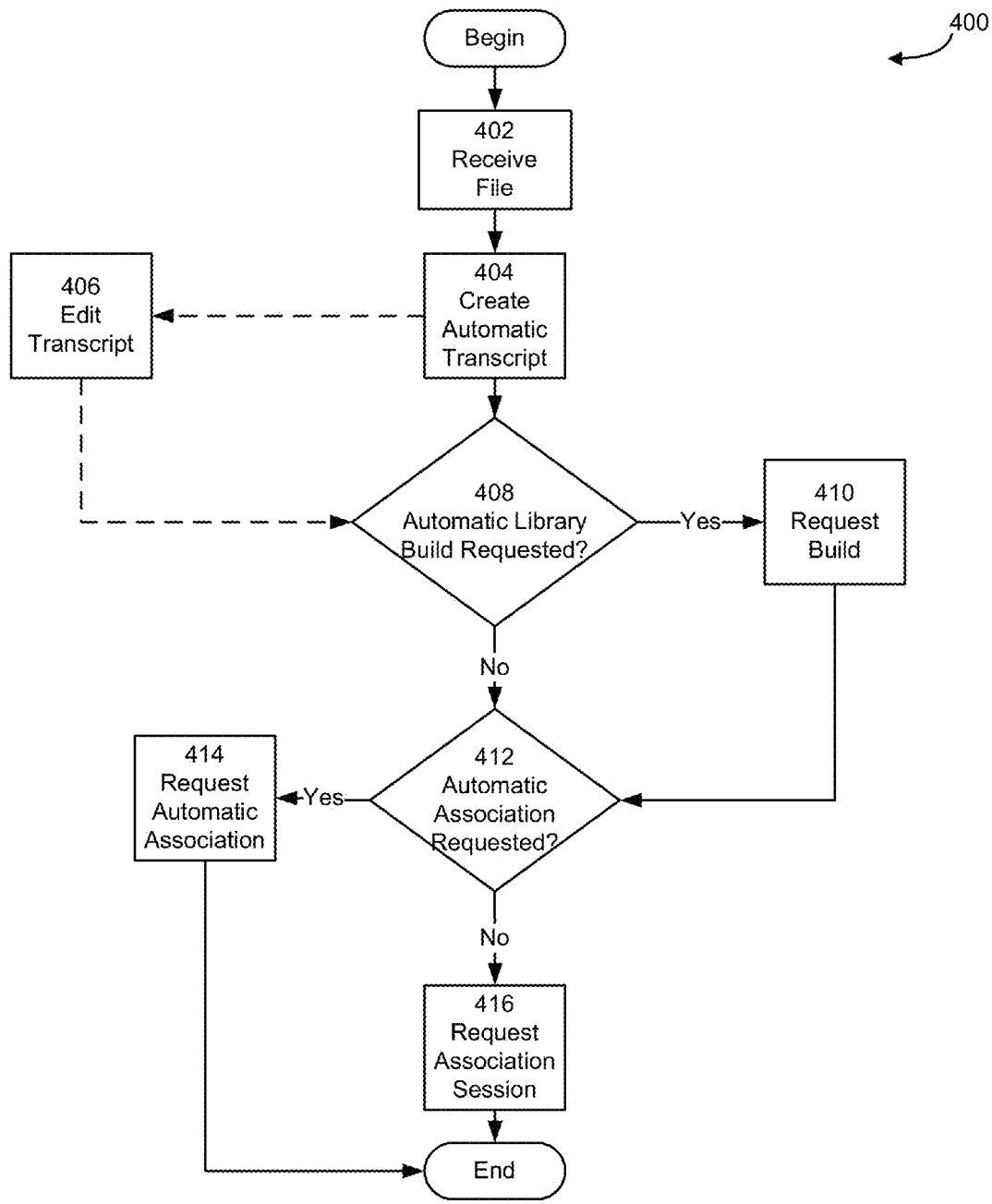
FIG. 4 is a flow diagram illustrating a process for generating associations between media files and metadata.

In some embodiments processes are performed that associate metadata with media using a metadata association system, such as the metadata association system 100 described above with reference to FIG. 1. An example of one of these association processes is illustrated by FIG. 4. According to this example, the association process 400 includes several acts of receiving a media file, creating an ASR transcription, editing a transcription, determining whether to automatically build a metadata library, automatically building the metadata library, determining whether to automatically associate metadata with the media file, automatically associating the metadata with the media file, and requesting an association session.

In act 402, the metadata association system receives a media file to be associated with metadata. In at least one embodiment, the metadata association system receives the media file via a user interface, such as the user interface 124 described above with reference to FIG. 1. In this embodiment, the user interface stores the media file in a media file storage, such as the media file storage 136 described above with reference to FIG. 1.

Next, in act 404, the user interface requests that an ASR device, such as the ASR device 122 described above with reference to FIG. 1, produce draft transcription information via a system interface, such as the system interface 128 described above with reference to FIG. 1. In response to receiving the request, the ASR device produces draft transcription information for the media file and provides the draft transcription information to the system interface. In at least one embodiment, the system interface, in turn, executes the File_Create_Draft function described above to create a draft transcription file from ASR output included in the draft transcription information. The system interface next stores the draft transcription file in the media file storage and stores media file information descriptive of the media file and draft transcription information descriptive of the draft transcription file in a job data storage, such as the job data storage 134, described above with reference to FIG. 1.

In act 406, the user interface or an editor interface, such as an editor interface as described in the '123 Application, modifies the draft transcription information to improve its accuracy. For example, the user interface or the editor interface may receive edits to the draft transcription information via a client computer, such as the client computer 104 described above with reference to FIG. 1. These edits may alter any aspect of the draft transcription information including the presence or absence of a token, adding new tokens (including empty strings), the text included in a token, or media synchronization information associated with tokens. Further, these edits may add specialized tokens referred to herein as "annotations" which are non-verbal descriptions of portions of media, such as ANNOUNCER:, [CROWD NOISE], [SILENCE], and [MUSIC PLAYING]) to the draft transcription information. Responsive to receipt of the edited transcription information, the user interface or editor interface stores the edited transcription information for subsequent processing.

After the draft transcription information is created (and in some embodiments, edited), the user interface determines whether a request to automatically build a metadata library for the media file has been received in act 408. If so, the user interface executes act 410. Otherwise, the user interface executes act 412.

In the act 410, the user interface sends a build request to an association engine, such as the association engine 132 described above with reference to FIG. 1 in act 410. In some embodiments, responsive to receipt of the build request, the association engine executes the File_Create_Metadata_Library function to build a metadata library. One example of a process executed by the association engine to a build a metadata library is described below with reference to FIG. 7.

In the act 412, the user interface determines whether a request to automatically associate metadata with the media file has been received. If so, the user interface executes act 414. Otherwise, the user interface executes act 416.

In the act 414, the user interface sends an automatic association request to the association engine and terminates the association process 400. In some embodiments, responsive to receipt of the build request, the association engine executes the File_Associate_Metadata function to automatically associate metadata with at least one media file. One example of a process executed by the association engine to an automatic association metadata with a media file is described below with reference to FIG. 8.

In the act 416, the user interface creates a request for an association session and terminates the association process 400. Examples of a process executed by the user interface in response to an association session request are described below with reference to FIG. 5.

Figure 5:
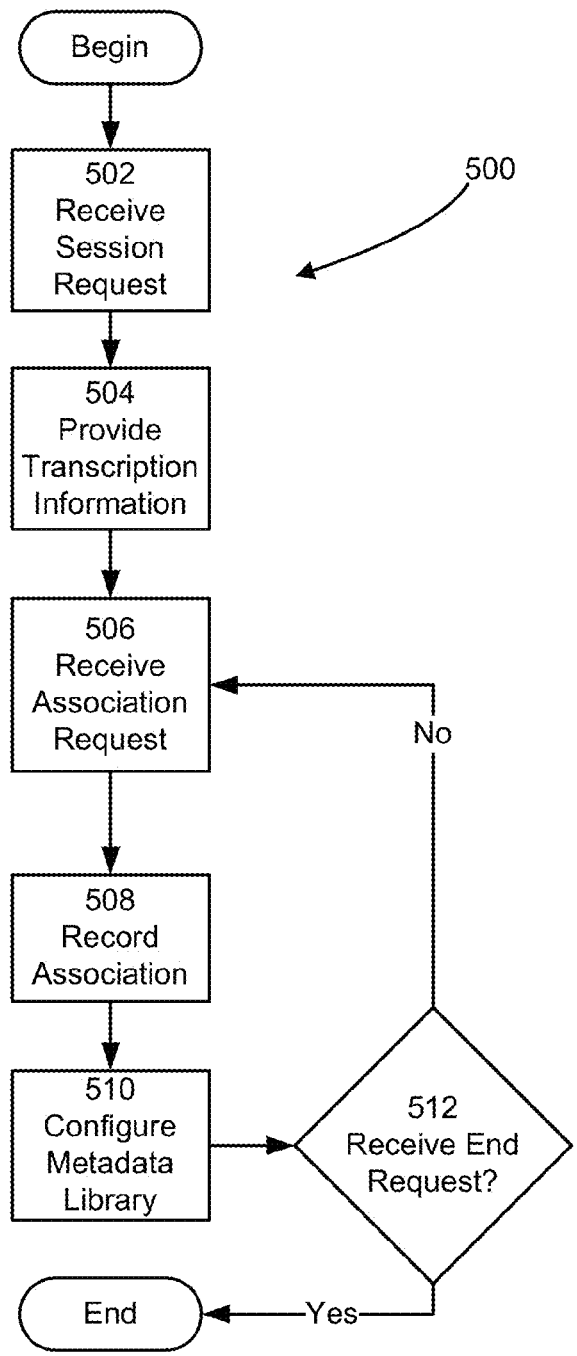
FIG. 5 is a flow diagram illustrating a process for executing an association session with a user.

As described above with reference to FIGS. 1 and 4, in some embodiments a metadata association system, such as the metadata association system 100 described above with reference to FIG. 1, executes processes that facilitate associating metadata with media. An example of one of these processes is illustrated by FIG. 5. According to this example, an association session process 500 includes acts of receiving an association session request, providing transcription information to a user, receiving an association request, recording an association, configuring a metadata library, and determining whether a request to end the association session has been received.

In act 502, a user interface, such as the user interface 124 described above with reference to FIG. 1, receives a request to execute a metadata association session with a user, such as the user 110 described above with reference to FIG. 1. In response to receiving the association session request, the user interface presents one or more elements through which the user interface provides transcription information and receives association requests. One exemplary set of user interface elements presented in accord with act 502 is described above with reference to FIG. 9.

In act 504, the user interface presents transcription information to a user via an output device. In one embodiment, the transcription information is displayed as simple text, such as the display illustrated in FIG. 12. The transcription information shown in FIG. 12 may be stored as an XML data structure as shown in FIG. 22.

In the example illustrated in FIG. 22, the time codes for each token are represented as frame offsets into a feature vector sequence extracted from the media file at a constant sampling rate (e.g., 100 feature vectors per second). These frame offsets can be converted to times in the media file using the feature vector sampling rate. The <string> elements are displayed by the user interface (e.g., the interface depicted in FIG. 12). The <speaker_tag> elements include start and end frames which correspond to the entire duration of a speaker's utterance. There may be multiple speaker_tags from the same speaker throughout a time-coded transcript.

Upon completion of act 504, the user may interact with the displayed strings of tokens, attaching metadata to particular token sequences, while, underlying this interaction, the synchronization information (e.g., time codes as represented by the start_frame and end_frame elements) are tracked to maintain synchronization with the original media.

In one embodiment, the user may select a token or a sequence of tokens by highlighting the token or sequence of tokens and clicking on the highlighted token or sequence of tokens using an input device, such as a mouse or keyboard. In some embodiments, the user interface is configured to translate a click generated from the left button of a mouse as a selection of the highlighted token or sequence of tokens. In other embodiments, the user interface is configured to translate a click generated from the right button of the mouse as a selection of the whitespace between two tokens within the sequence of tokens, (e.g. the whitespace in closest proximity to the location of the click). FIG. 13 illustrates an example in which the user highlights and clicks on a single token ("coefficients") of transcription information displayed by the user interface. As shown in FIG. 13, the user interface responds by providing a dialog in which the user may select to associate either a URL or a document with the token. FIG. 14 illustrates an example in which the user highlights a sequence of tokens and clicks on a portion of the highlighted sequence. In response, the user interface may display a list of available metadata elements (including text documents, images, PDFs, URLs, etc.) included within a metadata library associated with the media file. Each metadata element displayed may have available help information which describes the element in more detail. The user may then select a metadata element which the user wishes to associate with the selected token or sequence of tokens, thereby creating an association request. FIG. 15 illustrates an example in which the user selects a URL to associate with the selected token.

In act 506, the user interface receives an association request. In act 508, the user interface stores the selected metadata within the transcription information. For example, a new association may be stored as the following XML:

<document><path>c:/media_links/more_info_on_quadratic_formula.doc</path><start_frame>1589</start_frame><end_frame>1834</end_frame></document>

In this embodiment, user interface determines the start_frame and end_frame sub-elements with reference to the selected token or sequence of tokens. In the case of a selected token, the user interface assigns (and stores) the start_frame and end_frame of the selected token to the start_frame and the end_frame of the metadata element (the document in the XML presented above). In the case of a selected sequence of tokens, the user interface assigns (and stores) the start_frame of the first token in the sequence to the start_frame of the metadata element and assigns (and stores) the end_frame of the last token in the sequence to the end_frame of the metadata element. In the case of a user-interface action (e.g. a right mouse-click) indicating that the association is to be made to the time interval between two tokens, the user interface assigned and stores the end_frame of the first token to the start_frame of the metadata element and assigns (and stores) the start_frame of the second token to the end_frame of the metadata element. It is to be appreciated that, where the token is a speaker_tag, the start_frame and end_frame of the metadata element would cover the entire duration of the speaker, as indicated by the start_frame and the end_frame of the speaker_tag.

In act 510, the user interface configures the metadata library associated with the media file to include the selected metadata. In act 512, the user interface determines whether it has received a request to end the metadata association session. If so, the user interface terminates the process 500. Otherwise, the user interface awaits another request.

Processes in accord with the process 500 produce multidimensional metadata objects that may be stored within transcription information that is synchronized with a media file. This multidimensional metadata object can be embedded on web pages that also allow playback of the media file. As the media file plays, the metadata object is referenced, and the content therein is accessible to the user at the appropriate times. So, for example, the user interface may display a "Click Here For More Info" button as the media file plays at a time segment where a URL has been associated to the media file. Or, a textual overlay defining a term could be displayed over or near the video. Thus processes in accord with the process 500 increase user engagement with online media, thereby increasing the value that users gain from reviewing, and interacting with, online media.

Figure 17:
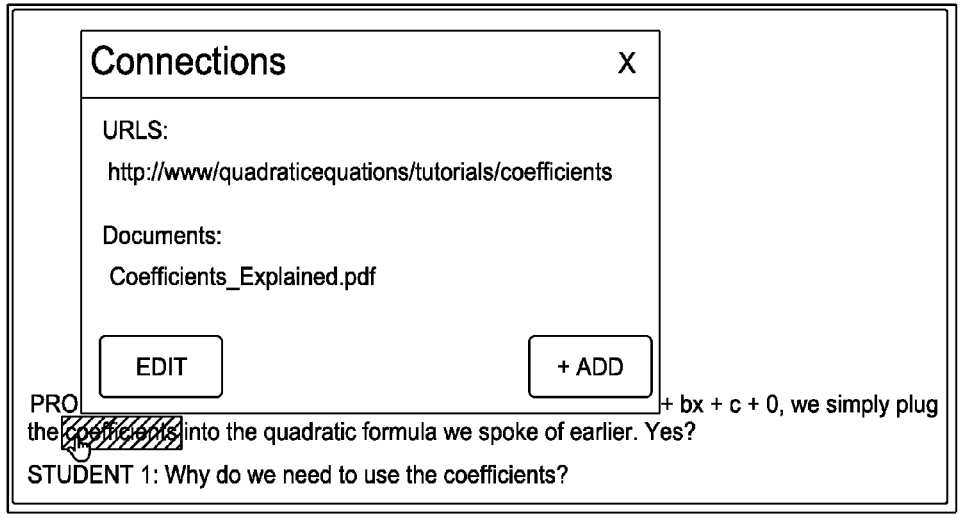
FIG. 17 is an illustration of a set of user interface elements configured to provide metadata association information.
Figure 18:
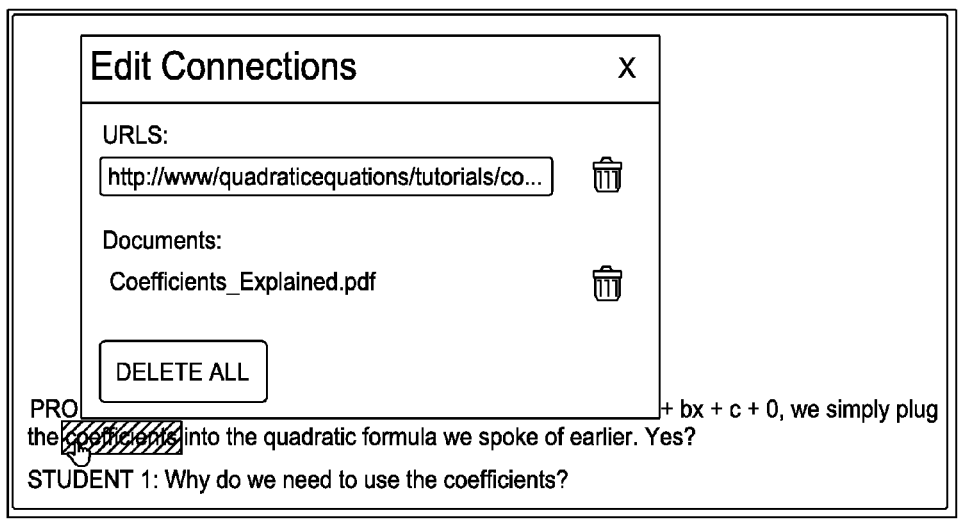
FIG. 18 is an illustration of a set of user interface elements configured to receive requests to edit metadata associations.

FIGS. 16-18 depict examples other sorts of requests that the metadata association user interface may receive. FIG. 16 illustrates an example in which the user selects a document to associate with the same token. FIG. 17 illustrates an example in which the user reviews the metadata currently associated with the token by clicking on the token. FIG. 18 illustrates an example in which the user has selected the edit button from the dialog displayed in FIG. 17. In this example, the user may delete one or more of the metadata associations linked to the token.

Figure 6:
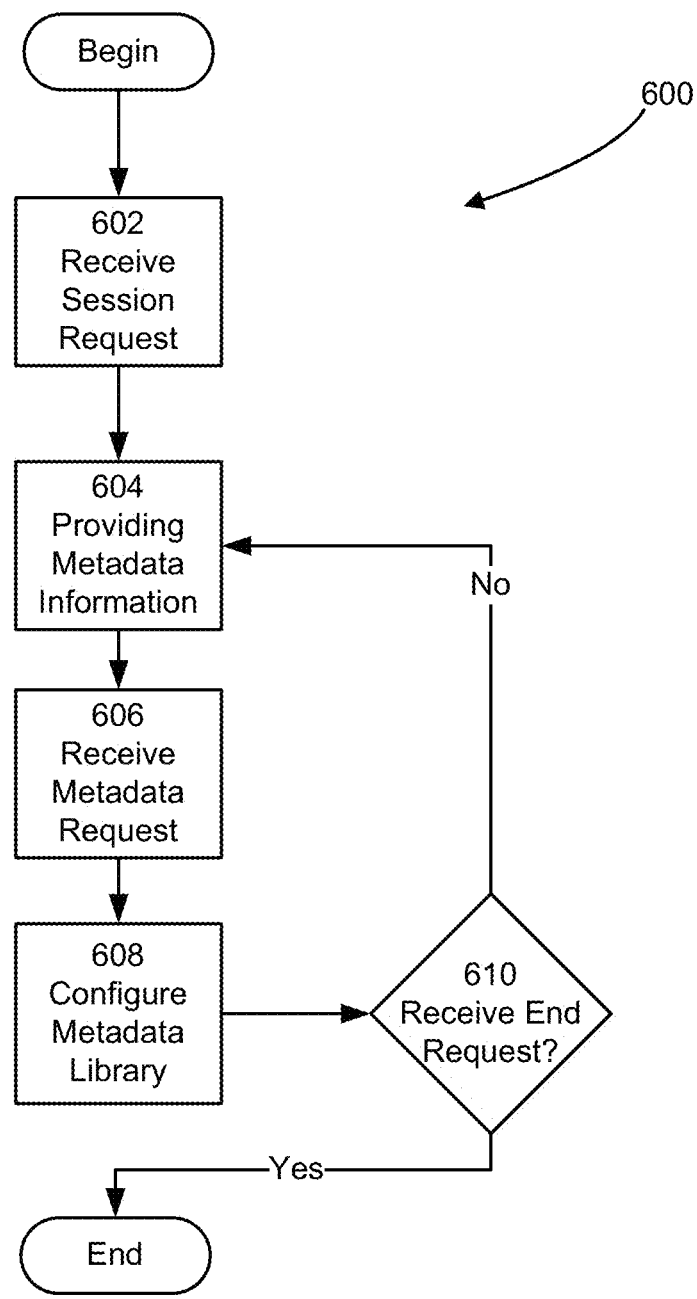
FIG. 6 is a flow diagram illustrating a process for executing a metadata library build session with a user.

As described above with reference to FIG. 1, in some embodiments a metadata association system, such as the metadata association system 100 described above with reference to FIG. 1, executes processes that facilitate building a metadata library associated with a media file. An example of one of these processes is illustrated by FIG. 6. According to this example, a build process 600 includes acts of receiving a metadata build session request, providing information descriptive of a metadata library to a user, receiving a metadata request, configuring the metadata library, and determining whether a request to end the association session has been received.

In act 602, a user interface, such as the user interface 124 described above with reference to FIG. 1, receives a request to execute a metadata library build session with a user, such as the user 110 described above with reference to FIG. 1. In response to receiving the build session request, the user interface presents one or more elements through which the user interface provides transcription information and receives association requests. One exemplary set of user interface elements presented in accord with act 602 is described above with reference to the metadata library window illustrated in FIG. 9.

In act 604, the user interface presents metadata library information to a user via an output device. In one embodiment, the metadata library information is displayed shown in FIG. 9.

Figure 19:
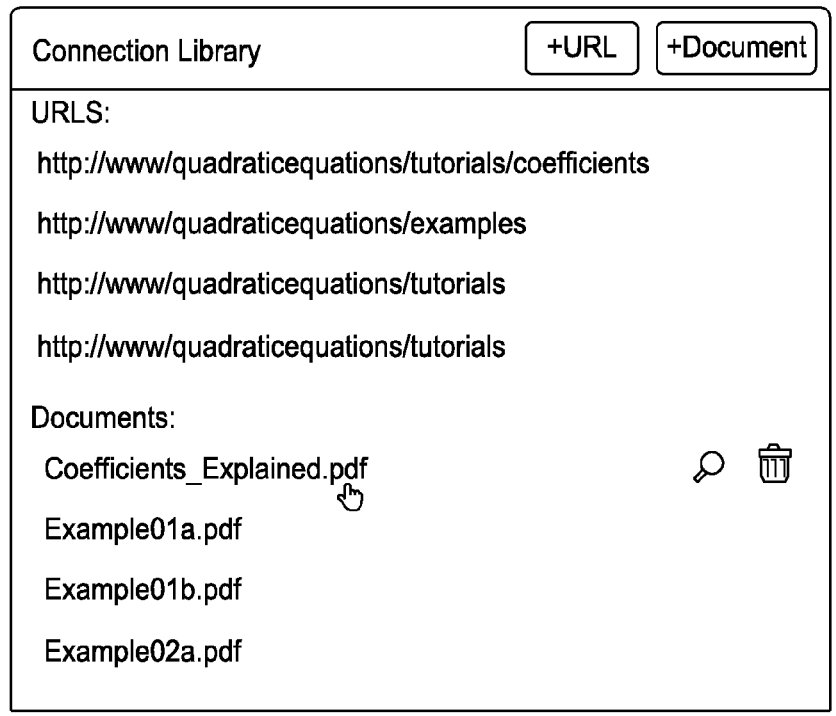
FIG. 19 is an illustration of a set of user interface elements configured to receive requests to edit a metadata library.

In act 606, the user interface receives a request to change the metadata within the metadata library. FIG. 19 illustrates an example in which the user interface presents several options to change the metadata library to the user. In addition to the add URL button and the add document button, the embodiment illustrated in FIG. 19 provides a trash can icon and a magnifying glass icon. According to this embodiment, responsive to receiving an indication that the user has selected the magnifying glass icon, the user interface displays a preview of the highlighted metadata element. Also according to this embodiment, the user interface records a request to delete the highlighted metadata element in response to receiving an indication that the user has selected the trash can icon.

In act 608, the user interface configures the metadata library associated with the media file to reflect the change (add, delete, or modify) requested in the act 606. According to one embodiment, the metadata library is stored within the synchronized transcription information as an extension of the XML schema described above with reference to FIG. 5, e.g. using a <metadata_library> major element, with various <url>, <document>, <image>, <action>, etc. sub-elements. Each sub-element may have a <summary> attribute, with text to be displayed by the user interface where the user seeks more information about the metadata element during a metadata association process. In some embodiments, for the metadata elements that are pre-populated automatically using natural language and information theoretic processing techniques, the text included in the <summary> attribute is the query which resulted in selection of the metadata element. Processes for pre-populated metadata elements and libraries are described below with reference to FIG. 7.

In act 610, the user interface determines whether it has received a request to end the metadata build session. If so, the user interface terminates the process 600. Otherwise, the user interface awaits another request.

Figure 7:
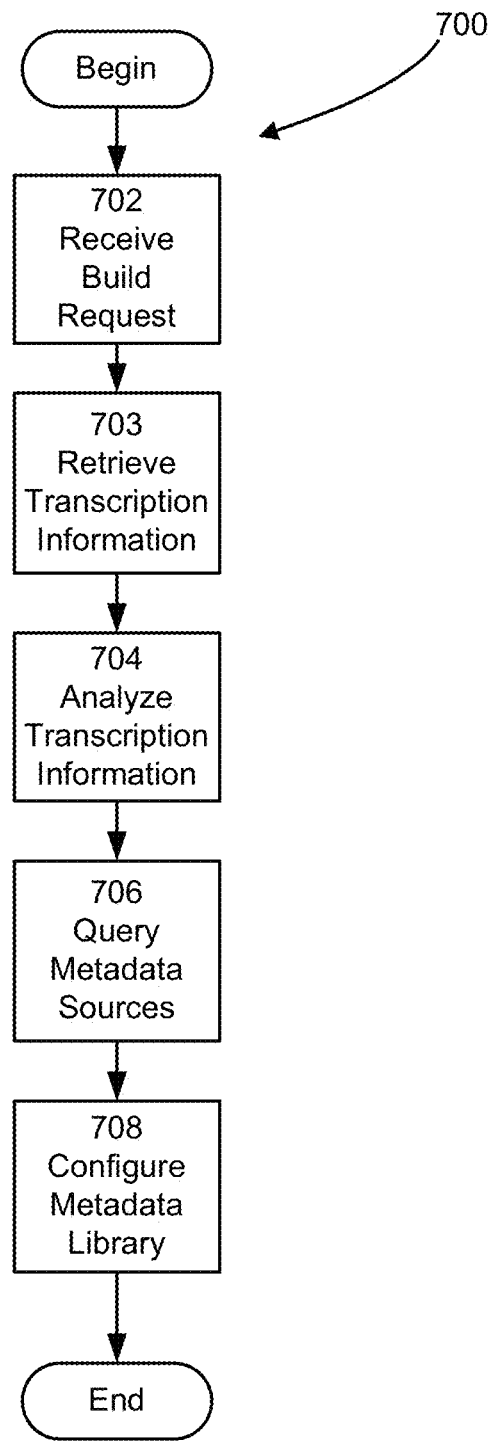
FIG. 7 is a flow diagram illustrating a process for automatically building a metadata library.

As described above with reference to FIGS. 1, 2, and 4, in some embodiments a metadata association system, such as the metadata association system 100 described above with reference to FIG. 1, executes processes that automatically build a metadata library associated with a media file. An example of one of these processes is illustrated by FIG. 7. According to this example, an automated build process 700 includes acts of receiving an automated metadata build request, analyzing transcription information, querying metadata sources, and configuring the metadata library.

In act 702, an association engine, such as the association engine 132 described above with reference to FIG. 1, receives a request to execute an automated build process for a media file or project. The automated build request may include information identifying a set of media files targeted for automatic metadata library creation and one or more sources of metadata from which the metadata library will be automatically built. In act 703, the association engine retrieves transcription information that is synchronized with the targeted set of media files from a job data storage, such as the job data storage 134 described above with reference to FIG. 1. In act 704, the association engine analyzes, using natural language and information theoretic processing techniques, transcription information synchronized with the targeted set of media files to generate a set of highly informative words or phrases. In act 706, the association engine queries one or more identified metadata sources in search of metadata related to the words or phrases generated in the act 704. The sources of metadata may include a wide variety of sources, such as the client computer 104, the server computer 102, other computer systems on the network 116, or any of the sources available on the internet. In some embodiments, the association engine calculates a relevance score for each element of metadata returned by the querying process and compares the relevance score to a first threshold. Where the relevance score is less than the first threshold, the association engine discards the metadata element. In other embodiments, the association engine sorts the metadata elements by relevance score in descending order and discards metadata element whose sorted ordinal value exceeds a second threshold.

In act 708, the association engine configures the metadata library associated with the media file to reflect the metadata elements returned and processed in the act 706. Next, the association engine terminates the process 700.

Figure 8:
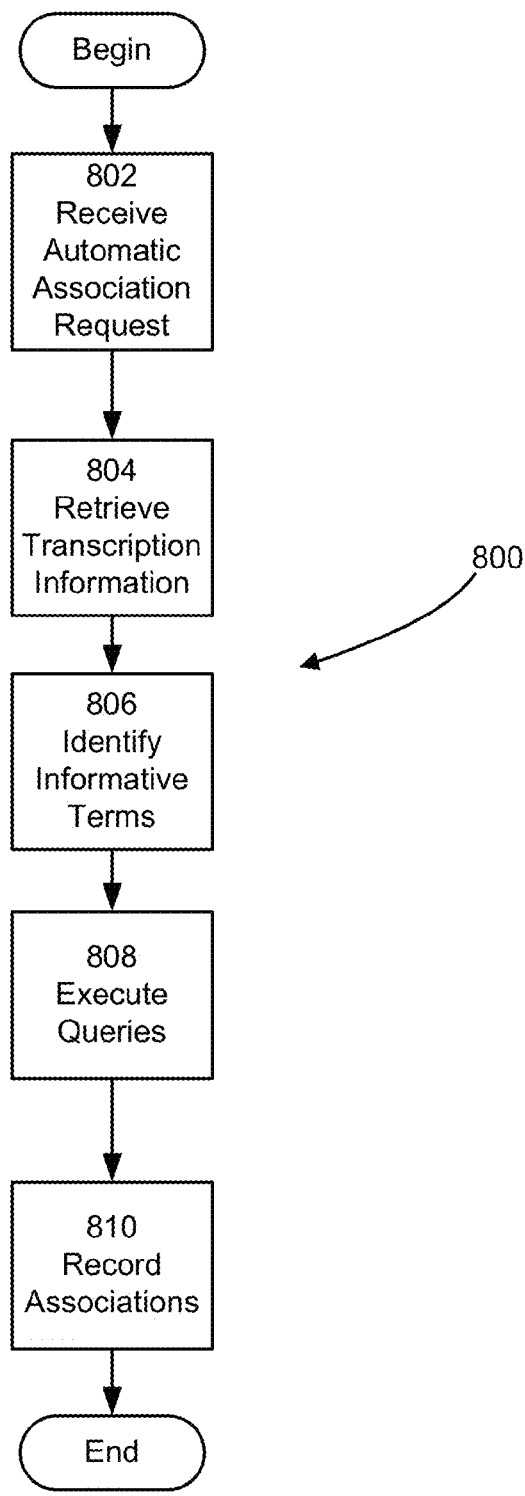
FIG. 8 is a flow diagram illustrating a process for associating metadata with a media file.

As described above with reference to FIG. 4, in some embodiments a metadata association system, such as the metadata association system 100 described above with reference to FIG. 1, executes processes that automatically associate metadata with a media file. An example of one of these processes is illustrated by FIG. 8. According to this example, an automated association process 800 includes acts of receiving an automated metadata association request, analyzing transcription information, and recording associations.

In act 802, an association engine, such as the association engine 132 described above with reference to FIG. 1, receives a request to execute an automated association process for a media file or a project. The automated association request may include information identifying a set of media files targeted for automatic metadata association, one or more sources for metadata to associate with the targeted media file or the targeted project, an importance threshold, a relevance threshold, and an association limit. Sources of metadata may include predefined metadata libraries, on a server computer, such as the server computer 102, and the internet. In act 804, the association engine retrieves transcription information that is synchronized with the targeted set of media files from a job data storage, such as the job data storage 134 described above with reference to FIG. 1. In act 806, the association engine uses information theoretic processing techniques to identify informative terms (e.g., words, phrases, and the like) within the transcription information that have an importance score that exceeds the importance threshold. In act 808, the association engine generates search queries designed to identify metadata within the sources that is relevant to the informative terms. The association engine then executes the queries against the sources and calculates a relevance score for each element of metadata returned. The returned elements of metadata may include documents, URLs, videos, images, and other information. In some embodiments, the association engine uses textual information (e.g., textual tags, ASR transcriptions, and the like) that is descriptive of the content of non-textual elements of metadata (e.g., videos, images, audio, and the like) to calculate a relevance score for the non-textual elements of metadata. In other embodiments, the source is a metadata library including elements that each belong to a topic. In these embodiments, the association engine calculates the relevance score by re-executing the query against the internet (via, for example, an internet search engine), grouping the internet query results by the topics of the elements, and assigning a relevance score to each element that equals the number of internet query results that belong to the topic group for that element.

In act 810, the association engine identifies elements of metadata with a relevance score that exceeds the relevance threshold and associates the identified metadata elements with the informative terms that correspond to the query that returned the identified metadata elements. In some embodiments, within the act 810, the association engine limits the number of associations to any one term to the association limit. Next, the association engine terminates the process 800.

Processes 400-800 each depict one particular sequence of acts in a particular example. The acts included in these processes may be performed by, or using, one or more computer systems specially configured as discussed herein. Some acts are optional and, as such, may be omitted in accord with one or more examples. Additionally, the order of acts can be altered, or other acts can be added, without departing from the scope of the systems and methods discussed herein. Furthermore, as discussed above, in at least one example, the acts are performed on a particular, specially configured machine, namely a transcription system configured according to the examples and embodiments disclosed herein.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A system for associating metadata with at least one media file, the system comprising:
   a memory storing transcription information associated with the at least one media file, the transcription information being associated with synchronization information that synchronizes the transcription information with the at least one media file, the synchronization information including a portion that identifies a portion of the at least one media file and that associates a portion of the transcription information with the portion of the at least one media file;
   at least one processor coupled to the memory;
   a component executed by the at least one processor and configured to associate metadata with the portion of the at least one media file by storing an association between the portion of the synchronization information and the metadata within the memory, the metadata being distinct from the transcription information and the synchronization information; and
   an interface component configured to provide the metadata in synchronicity with the portion of the at least one media file during playback of the at least one media file.

2. The system according to claim 1, wherein the component is further configured to retrieve the metadata from a metadata library stored in the memory.

3. The system according to claim 2, wherein the component is further configured to:
   retrieve the metadata from at least one of the system, a remote computer system in data communication with the system via a local network, and a remote computer system in data communication with the system via the internet; and
   store the metadata in the metadata library.

4. The system according to claim 3, wherein the metadata includes at least one of a uniform resource locator, a document, and an action.

5. The system according to claim 4, wherein the component includes an association engine configured to automatically build the metadata library.

6. The system according to claim 5, wherein the association engine is further configured to automatically associate the metadata with the at least one media file.

7. The system according to claim 4, wherein the component includes a user interface configured to execute a process, conducted by a user, to build the metadata library.

8. The system according to claim 7, wherein the user interface is further configured to execute a process, conducted by the user, to associate the metadata with the at least one media file.

9. The system according to claim 1, wherein the interface component is configured to provide the metadata in synchronicity with the portion of the at least one media file during playback of the at least one media file at least in part by referencing the portion of the synchronization information.

10. A method of associating metadata with at least one media file using a computer system including a processor and memory storing transcription information associated with the at least one media file, the transcription information being associated with synchronization information that synchronizes the transcription information with the at least one media file, the synchronization information including a portion that identifies a portion of the at least one media file and that associates a portion of the transcription information with the portion of the at least one media file, the method comprising;
   associating the metadata with the portion of the at least one media file by storing an association between the portion of the synchronization information and the metadata within a memory, the metadata being distinct from the transcription information and the synchronization information; and providing the metadata in synchronicity with the portion of the at least one media file during playback of the at least on media file.

11. The method according to claim 10, wherein associating the metadata with the at least one media file includes retrieving the metadata from a metadata library stored in the memory.

12. The method according to claim 11, further comprising:
retrieving the metadata from at least one of the computer system, a remote computer system in data communication with the method via a local network, and a remote computer system in data communication with the system via the internet; and
storing the metadata in the metadata library.

13. The method according to claim 12, wherein associating the metadata with the at least one media file includes associating at least one of a uniform resource locator, a document, and an action with the at least one media file.

14. The method according to claim 13, further comprising automatically building the metadata library.

15. The method according to claim 14, further comprising automatically associating the metadata with the at least one media file.

16. The method according to claim 13, further comprising executing a process, conducted by a user, to build the metadata library.

17. The method according to claim 16, further comprising executing a process, conducted by the user, to associate the metadata with the at least one media file.

18. The method according to claim 10, wherein providing the metadata includes providing the metadata in synchronicity with the portion of the at least one media file during playback of the at least one media file at least in part by referencing the portion of the synchronization information.

19. A non-transitory computer readable medium storing sequences of instructions for performing a process of associating metadata with at least one media file, the sequences including instructions executable by at least one processor of a computer system that instruct the computer system to:
associate the metadata with a portion of the at least one media file by storing an association between a portion of synchronization information and the metadata within a memory of the computer system, the portion of the synchronization information identifying the portion of the at least one media file and associating a portion of the transcription information with the portion of the at least one media file, the synchronization information synchronizing the transcription information with the at least one media file, the metadata being distinct from the transcription information and the synchronization information; and
provide the metadata in synchronicity with the portion of the at least one media file during playback of the at least on media file.

20. The computer readable medium according to claim 19, wherein the instructions to provide the metadata further instruct the at least one processor to provide the metadata in synchronicity with the portion of the at least one media file during playback of the at least one media file at least in part by referencing the portion of the synchronization information.

* * * * *